(12) United States Patent
Li et al.

(10) Patent No.: US 11,753,045 B2
(45) Date of Patent: Sep. 12, 2023

(54) MODELING POSITIONAL UNCERTAINTY OF MOVING OBJECTS USING PRECOMPUTED POLYGONS

(71) Applicant: Waymo LLC, Mountain View, CA (US)

(72) Inventors: Dong Li, Los Gatos, CA (US); Victor Puchkarev, Santa Cruz, CA (US)

(73) Assignee: WAYMO LLC, Mountain View, CA (US)

(*) Notice: Subject to any disclaimer, the term of this patent is extended or adjusted under 35 U.S.C. 154(b) by 143 days.

(21) Appl. No.: 17/354,614

(22) Filed: Jun. 22, 2021

(65) Prior Publication Data
US 2022/0402527 A1    Dec. 22, 2022

(51) Int. Cl.
*B60W 60/00* (2020.01)
*B60W 30/095* (2012.01)

(52) U.S. Cl.
CPC .... *B60W 60/00274* (2020.02); *B60W 30/095* (2013.01); *B60W 2554/404* (2020.02); *B60W 2720/24* (2013.01)

(58) Field of Classification Search
None
See application file for complete search history.

(56) References Cited

U.S. PATENT DOCUMENTS

| | | | | |
|---|---|---|---|---|
| 2019/0146498 A1* | 5/2019 | Balachandran | .......... | G06N 7/08 701/23 |
| 2021/0041887 A1* | 2/2021 | Whitman | ............. | G05D 1/0274 |
| 2021/0046954 A1* | 2/2021 | Haynes | ........... | B60W 60/00276 |
| 2021/0078173 A1* | 3/2021 | Zhou | ........................ | B25J 9/163 |
| 2021/0284198 A1* | 9/2021 | Schmidt | .............. | B60W 30/143 |
| 2021/0294333 A1* | 9/2021 | Jing | ...................... | G05D 1/0212 |
| 2021/0370921 A1* | 12/2021 | Silva | ................. | B60W 60/0027 |
| 2021/0406560 A1* | 12/2021 | Park | ....................... | G06V 10/82 |

(Continued)

FOREIGN PATENT DOCUMENTS

CN    111830979 A   * 10/2020   .......... G05D 1/0223

OTHER PUBLICATIONS

Hang et al., "Path planning of collision avoidance for unmanned ground vehicles: A nonlinear model predictive control approach", Proc IMechE Part I: J Systems and Control Engineering, 2020 (Year: 2020).*

(Continued)

*Primary Examiner* — Anne Marie Antonucci
*Assistant Examiner* — Amelia Vorce
(74) *Attorney, Agent, or Firm* — Lowenstein Sandler LLP

(57) ABSTRACT

Aspects and implementations of the present disclosure relate to modeling of positional uncertainty of moving objects using precomputed polygons, for example, for the purposes of computing autonomous vehicle (AV) trajectories. An example method includes: receiving, by a data processing system of an AV, data descriptive of an agent state of an object; generating a polygon representative of the agent state; identifying extreme vertices of the polygon along a longitudinal axis parallel to a heading direction of the object or along a lateral axis orthogonal to the heading direction; and applying, based on the extreme vertices, at least one expansion transformation to the polygon along the longitudinal axis or the lateral axis to generate a precomputed polygon.

18 Claims, 16 Drawing Sheets

(56) References Cited

U.S. PATENT DOCUMENTS

2022/0135029 A1* 5/2022 Poubel Orenstein ........................
                                                    B60W 30/0956
                                                         701/301
2022/0161822 A1* 5/2022 Fonseca .......... B60W 30/18154
2022/0185266 A1* 6/2022 Shah ................. B60W 30/0956

OTHER PUBLICATIONS

Hodo et al., "Optimal Path Planning with Obstacle Avoidance for Autonomous Surveying", Auburn University, IEEE, 2010 (Year: 2010).*

Jacobs et al., "Planning Smooth Paths for Mobile Robots", University of California, 1989 International Conference on Robotics and Automation (Year: 1989).*

Lozano-Perez et al., "An Algorithm for Planning Collision-Free Paths Among Polyhedral Obstacles", IBM Thomas J. Watson Research Center, vol. 22, No. 10, Oct. 1979 (Year: 1979).*

Sedighi et al., "Fusing Direct Visibility Diagram with Clothoid Curves for Motion Planning", 2019 IEEE Intelligent Transportation Systems Conference (ITSC), Auckland, NZ, Oct. 27-30, 2019 (Year: 2019).*

* cited by examiner

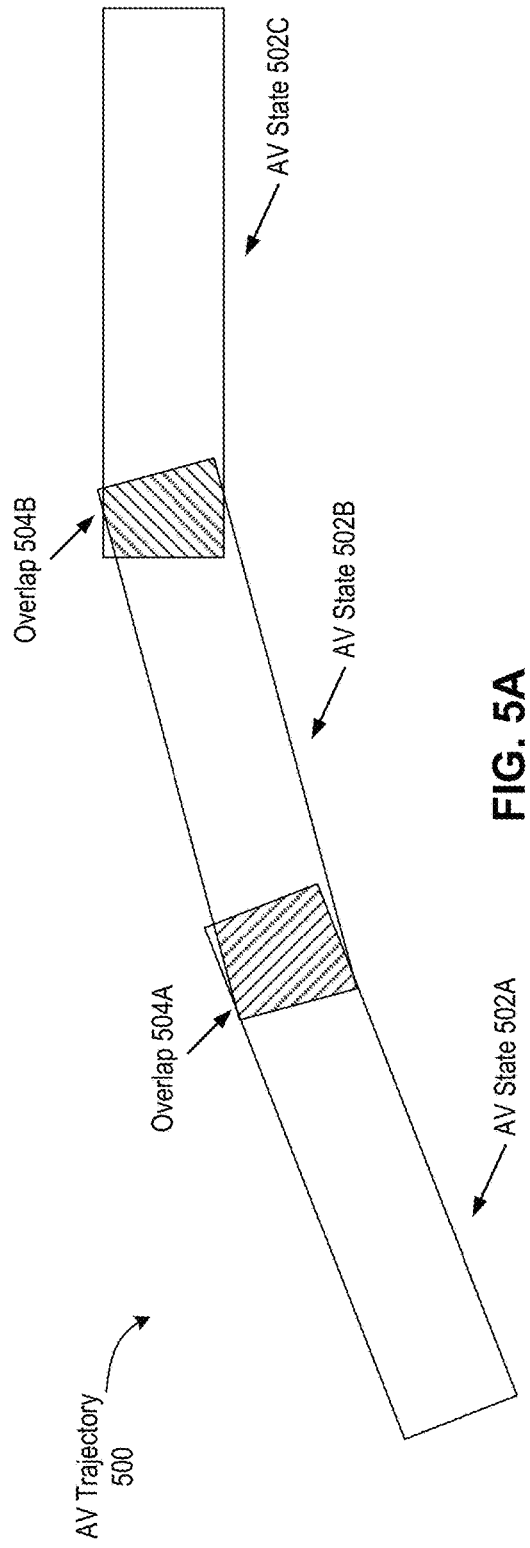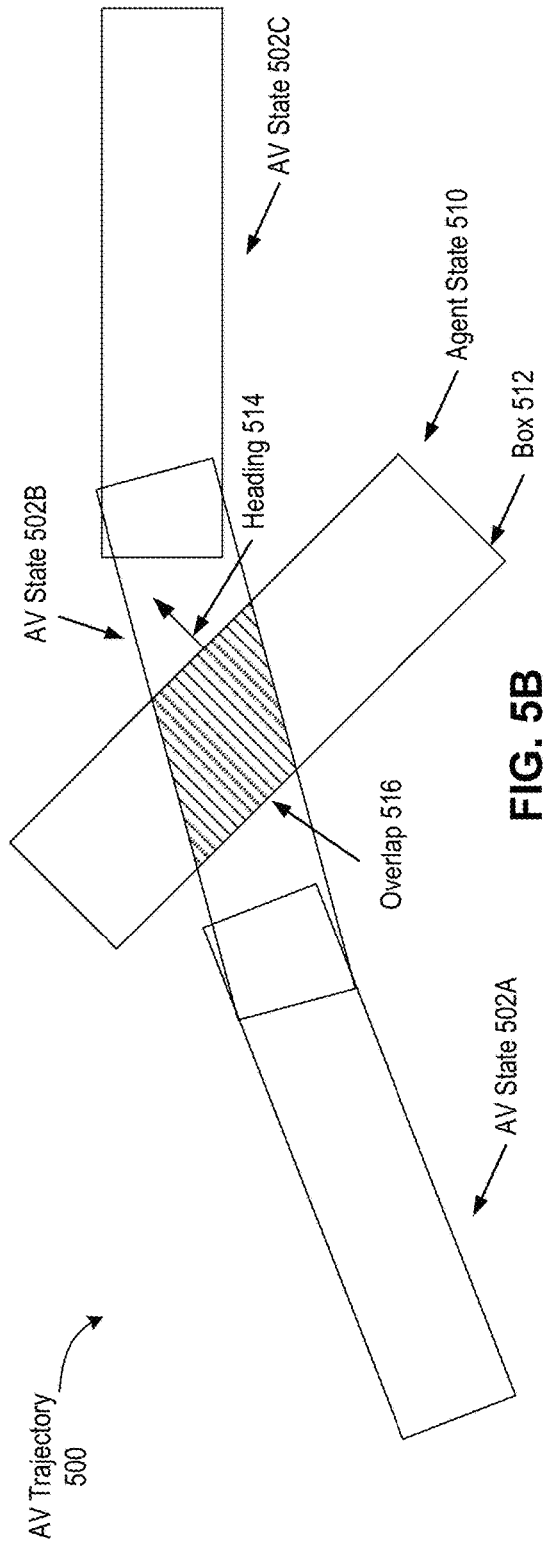
FIG. 5A
FIG. 5B

MODELING POSITIONAL UNCERTAINTY OF MOVING OBJECTS USING PRECOMPUTED POLYGONS

TECHNICAL FIELD

The instant specification generally relates to autonomous vehicles. More specifically, the instant specification relates to predicting trajectories of detected objects in autonomous driving environments.

BACKGROUND

An autonomous (fully and partially self-driving) vehicle (AV) operates by sensing an outside environment with various electromagnetic (e.g., radar and optical) and non-electromagnetic (e.g., audio and humidity) sensors. Some autonomous vehicles chart a driving path through the environment based on the sensed data. Precision and safety of the driving path and of the speed regime selected by the autonomous vehicle depend significantly on timely and accurate identification of various objects present in the driving environment, and on the ability of a driving algorithm to quickly and efficiently process the information about the environment and provide correct instructions to the vehicle controls and the drivetrain. Moreover, it is critical to correctly compute how the object's predicted path overlaps with the trajectory of the AV. Such computations can be performed by modeling the uncertainty of an object's behavior, such as lateral uncertainty relative to its traveling direction.

BRIEF DESCRIPTION OF THE DRAWINGS

The present disclosure is illustrated by way of examples, and not by way of limitation, and can be more fully understood with references to the following detailed description when considered in connection with the figures.

FIG. 5A illustrates an AV trajectory as a series of overlapping states in accordance with some implementations of the present disclosure.

FIG. 5B illustrates an agent state overlapping with the AV trajectory in accordance with some implementations of the present disclosure.

SUMMARY

Figure 1:
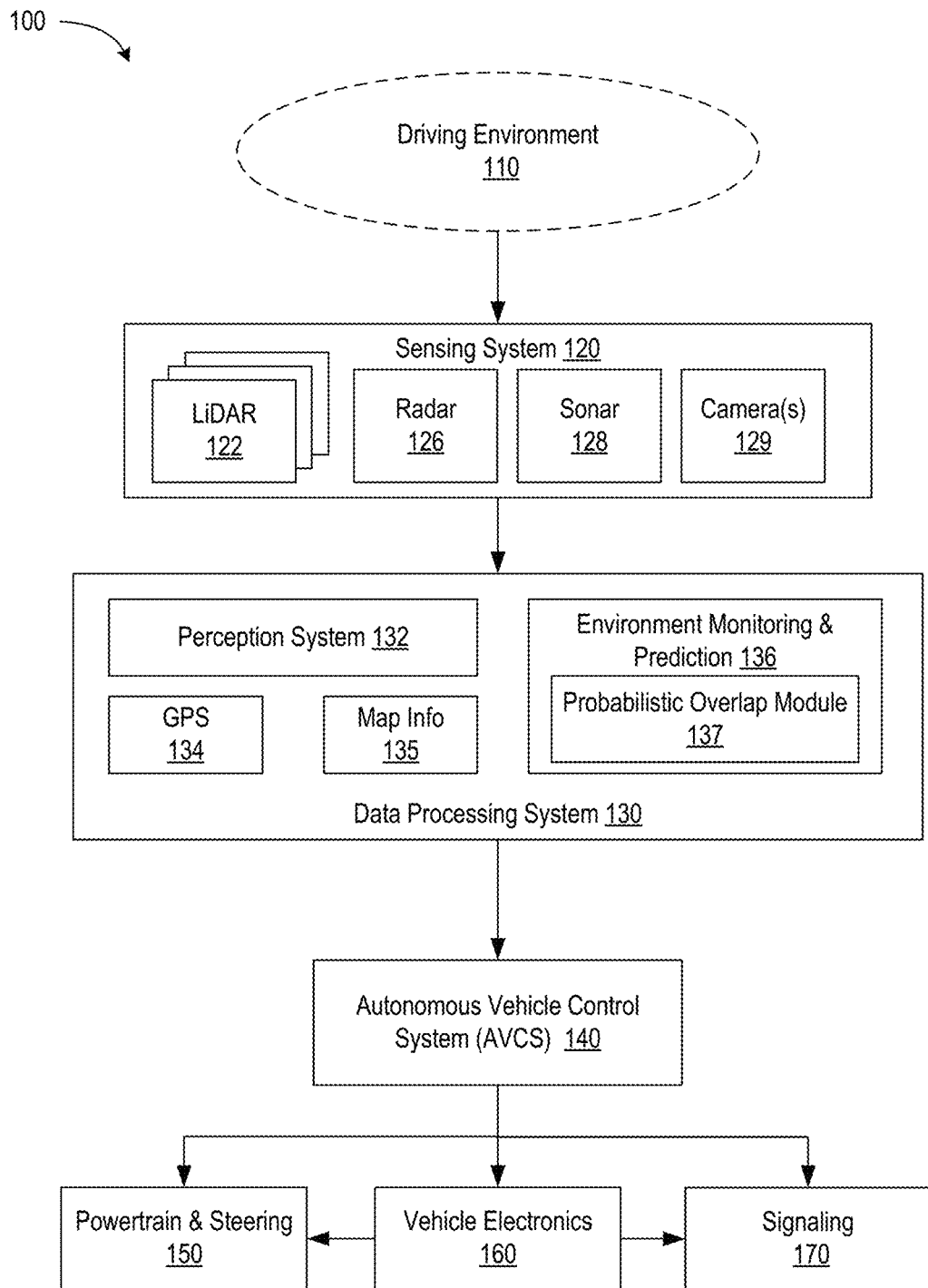
FIG. 1 is a diagram illustrating components of an example autonomous vehicle that uses Doppler-assisted object identification and tracking, in accordance with some implementations of the present disclosure.

The following presents a simplified summary of various aspects of the present disclosure in order to provide a basic understanding of such aspects. This summary is not an extensive overview of the disclosure. It is intended to neither identify key or critical elements of the disclosure, nor delineate any scope of the particular embodiments of the disclosure or any scope of the claims. Its sole purpose is to present some concepts of the disclosure in a simplified form as a prelude to the more detailed description that is presented later.

In one aspect of the present disclosure, a method comprises: receiving, by a data processing system of an autonomous vehicle (AV), data descriptive of an agent state of an object or a probabilistic overlap between the agent state and a trajectory of the AV; generating a polygon representative of the agent state or the probabilistic overlap; identifying extreme vertices of the polygon along a longitudinal axis parallel to a heading direction of the object or along a lateral axis orthogonal to the heading direction; and applying, based on the extreme vertices, at least one expansion transformation to the polygon along the longitudinal axis or the lateral axis to generate a precomputed polygon. In at least one implementation, a driving path or a speed of the AV is modified based on the precomputed polygon.

In at least one implementation, identifying the extreme vertices of the polygon comprises: identifying longitudinal extreme vertices of the polygon along the longitudinal axis; and identifying lateral extreme vertices of the polygon along the lateral axis. In at least one implementation, applying the at least one expansion transformation to the polygon along the longitudinal axis or the lateral axis comprises: applying a first expansion transformation to the polygon along the longitudinal axis to duplicate each lateral extreme vertex; and applying a second expansion transformation to the polygon along the lateral axis to duplicate each longitudinal extreme vertex.

In at least one implementation, the method further comprises applying at least one additional expansion transformation to the precomputed polygon based on an uncertainty of the agent state. In at least one implementation, a total number of vertices of the precomputed polygon is unchanged by the additional expansion transformation.

In at least one implementation, the at least one additional expansion transformation is applied to the precomputed polygon responsive to the data processing system receiving a query from a control system of the AV, the query indicating a level of risk tolerance with respect to the agent state. In at least one implementation, the method further comprises transmitting, to the control system, data representative of uncertainty in a longitudinal position and a lateral position of the object computed based on the precomputed polygon. In at least one implementation, the control system is to modify the driving path or the speed of the AV based on the data representative of uncertainty in the longitudinal position and the lateral position.

In at least one implementation, the method further comprises computing a trajectory of the object comprising a series of agent states that includes the agent state of the object. In at least one implementation, the precomputed polygon is used to model each agent state in the series of agent states.

In another aspect of the present disclosure, a system comprises: a memory; and a data processing system of an AV communicatively coupled to the memory. In some implementations, the data processing system is to: receive data descriptive of an agent state of an object or a probabilistic overlap between the agent state and a trajectory of the AV; generate a polygon representative of the agent state or the probabilistic overlap; identify extreme vertices of the polygon along a longitudinal axis parallel to a heading direction of the object or along a lateral axis orthogonal to the heading direction; and apply, based on the extreme vertices, at least one expansion transformation to the polygon along the longitudinal axis or the lateral axis to generate a precomputed polygon. In at least one implementation, a driving path or a speed of the AV is to be modified based on the precomputed polygon.

In at least one implementation, to identify the extreme vertices of the polygon, the data processing system is to: identify longitudinal extreme vertices of the polygon along the longitudinal axis; and identify lateral extreme vertices of the polygon along the lateral axis. In at least one implementation, to apply the at least one expansion transformation to the polygon along the longitudinal axis or the lateral axis, the data processing system is to: apply a first expansion transformation to the polygon along the longitudinal axis to duplicate each lateral extreme vertex; and apply a second expansion transformation to the polygon along the lateral axis to duplicate each longitudinal extreme vertex.

In at least one implementation, the data processing system is to further apply at least one additional expansion transformation to the precomputed polygon based on an uncertainty of the agent state. In at least one implementation, a total number of vertices of the precomputed polygon is unchanged by the additional expansion transformation.

In at least one implementation, at least one additional expansion transformation is to be applied to the precomputed polygon responsive to the data processing system receiving a query from a control system of the AV, the query indicating a level of risk tolerance with respect to the agent state.

In at least one implementation, the data processing system is to further transmit, to the control system, data representative of uncertainty in a longitudinal position and a lateral position of the object computed based on the precomputed polygon. In at least one implementation, the control system is to modify the driving path or the speed of the AV based on the data representative of uncertainty in the longitudinal position and the lateral position.

In at least one implementation, the data processing system is to further compute a trajectory of the object comprising a series of agent states that includes the agent state of the object. In at least one implementation, the precomputed polygon is to be used to model each agent state in the series of agent states.

In another aspect of the present disclosure, a non-transitory computer-readable medium has instructions stored thereon that, when executed by a computing device, cause the computing device to perform any implementation of the method described above.

DETAILED DESCRIPTION

An autonomous vehicle can employ various technologies and data sources for identifying static and moving objects within or near a roadway, such as a light detection and ranging (LiDAR) technology for detecting distances to and velocities of various objects, as well as radar devices, sonar devices, cameras, global position system (GPS) data, and roadway map data. Signals obtained by various sensing devices can be used in conjunction with other data by an on-board data processing system of the AV to identify relevant objects, determine their locations and velocities, classify those objects, and predict their behavior. Object data is monitored and updated in real-time, and is utilized by an AV control system to determine how the AV is to safely and legally navigate the roadway.

Some AV data processing systems and control systems utilize algorithms to predict how the objects overlap with the AV's trajectory in order to compute a safe driving trajectory. Such algorithms model the object's behavior based on uncertainty along certain directions. For example, the object may have a longitudinal uncertainty defined along the direction of its traveling direction (e.g., instantaneous velocity). The object may also have a lateral uncertainty along the direction orthogonal to its traveling direction. The object's predicted trajectory may be represented, for example, as a sequence of "agent states" each representing a position in time of the object, a direction of motion or heading of the object, and an uncertainty profile along lateral and longitudinal directions of the object. The object's uncertainty may be modeled, for example, by a Gaussian distribution characterized by a mean position and a standard deviation from the mean position.

Probabilistic overlaps can be computed between the AV and the agent state in order to estimate the risk of collisions between the AV and the object. When computing probabilistic overlaps, the overlap may be computed based on different lateral uncertainties, with each lateral uncertainty being representative of a risk tolerance for maneuverability of the AV. For example, probabilistic overlaps may be computed by using a polygon trajectory overlap computation method, storing each overlap, and performing linear interpolations. This method may involve constructing a polygon including the agent's lateral bounds followed by computing the overlap between the extended polygon and the trajectory of the AV. While such methods can accurately compute and model the probabilistic overlap, they are usually computationally intensive and time-consuming.

Polygon precomputation can be used to precompute angles of polygons representative of agent states and probabilistic overlaps so that extreme points of the polygon can be identified quickly without requiring computationally expensive trigonometric calculations to recompute angles when the polygon is rotated. When the object represented by the polygon moves along a trajectory, the polygon need only be translated and rotated without changing the shape of the polygon, thus allowing for a precomputed polygon to be reused at each point along the trajectory. When expanding a polygon representative of, for example, an agent state of an object, the expansion of the polygon occurs in four directions: two opposing directions oriented along the object heading (a longitudinal axis), and two opposing directions oriented a lateral axis (orthogonal to the longitudinal axis). However, when expanding the polygon's longitudinal and lateral bounds to model longitudinal and lateral uncertainties, respectively, the precomputed polygon is invalidated as such expansion transformations fail to preserve the precomputed angles of the polygon. As a result, further trigonometric calculations are needed to compute the updated angles resulting in significant computational costs.

Aspects and implementations of the present disclosure address these and other shortcomings of the existing technologies by modeling the AV and the agent state as simple polygons to facilitate computing the probabilistic overlap. Such implementations provide a more efficient method to support multiple queries (e.g., from an AV control system that control's the AV's driving path) as to the overlap between an AV's trajectory and an object's trajectory for different sets of lateral bounds of an agent state representing the object. In some implementations, computing the probabilistic overlap is a two-step process where (1) a parallelogram corresponding to maximum uncertainty in the lateral position of the object is computed, and (2) the parallelogram is interpolated based on lateral bounds representative of a particular amount of risk tolerance for maneuvering the AV. In certain scenarios, such as narrow streets, or crowded environments, the lateral bounds may be reduced (which is equivalent to higher risk tolerance) to determine, for example, if the AV can safely navigate past the object.

Aspects of the present disclosure address problems related to AV trajectory planning, namely how to efficiently compute probabilistic overlaps between the AV and an agent state of an object trajectory. In some implementations, the AV (or state of the AV) and the agent state are each modeled by boxes. Based on a pair of lateral bounds for the agent state, a probabilistic overlap can be computed. This approach is advantageously faster than prior approaches utilizing more complex geometries by a factor on the order of 100.

In some implementations, the probabilistic overlap representing maximum uncertainty is calculated and cached. The cached probabilistic overlap can be advantageously used in subsequent calculations based on a narrower set of lateral bounds by interpolating the probabilistic overlap shape using the narrower set of lateral bounds. Interpolation is faster by a factor of about 1.3 than re-calculation of the overlap and achieves the same accuracy, thus supporting multiple overlap queries efficiently.

Aspects of the present disclosure address problems related to applying expansion transformations to polygons representative of agent states or probabilistic overlaps to model longitudinal and lateral uncertainties. The implementations herein provide a method to expand the polygon in lateral and longitudinal direction to generate a precomputed polygon that preserves angular information of the original polygon. In some implementations, an initially generated polygon is expanded by first identifying extreme vertices along the longitudinal and lateral axes of the polygon. The polygon is then shifted along each axis by a unit or nominal distance, resulting in duplication of the identified extreme vertices and expandable edges between each extreme vertex and its corresponding duplicate. For subsequent calculations that utilize longitudinal and lateral shifts, the same precomputed polygon may be used to quickly compute extreme vertices of the expanded polygon to which the shifts are applied.

Advantages of the implementations described herein include, but are not limited to: (1) use of the precomputed polygon in subsequent calculations allowing for translations, rotations, and expansions without requiring angle recalculations; (2) reuse of the precomputed polygon to model each frame of the object's trajectory; and (3) efficient modeling of longitudinal and lateral uncertainty for any arbitrary object or probabilistic overlap shape.

FIG. 1 is a diagram illustrating components of an example autonomous vehicle (AV) 100 that uses Doppler-assisted object identification and tracking, in accordance with some implementations of the present disclosure. FIG. 1 illustrates operations of the example autonomous vehicle. Autonomous vehicles can include motor vehicles (cars, trucks, buses, motorcycles, all-terrain vehicles, recreational vehicle, any specialized farming or construction vehicles, and the like), aircraft (planes, helicopters, drones, and the like), naval vehicles (ships, boats, yachts, submarines, and the like), or any other self-propelled vehicles (e.g., sidewalk delivery robotic vehicles) capable of being operated in a self-driving mode (without a human input or with a reduced human input).

A driving environment 110 can include any objects (animated or non-animated) located outside the AV, such as roadways, buildings, trees, bushes, sidewalks, bridges, mountains, other vehicles, pedestrians, and so on. The driving environment 110 can be urban, suburban, rural, and so on. In some implementations, the driving environment 110 can be an off-road environment (e.g., farming or agricultural land). In some implementations, the driving environment can be an indoor environment, e.g., the environment of an industrial plant, a shipping warehouse, a hazardous area of a building, and so on. In some implementations, the driving environment 110 can be substantially flat, with various objects moving parallel to a surface (e.g., parallel to the surface of Earth). In other implementations, the driving environment can be three-dimensional and can include objects that are capable of moving along all three directions (e.g., balloons, leaves, etc.). Hereinafter, the term "driving environment" should be understood to include all environments in which an autonomous motion of self-propelled vehicles can occur. For example, "driving environment" can include any possible flying environment of an aircraft or a marine environment of a naval vessel. The objects of the driving environment 110 can be located at any distance from the AV, from close distances of several feet (or less) to several miles (or more).

The example AV 100 can include a sensing system 120. The sensing system 120 can include various electromagnetic (e.g., optical) and non-electromagnetic (e.g., acoustic) sensing subsystems and/or devices. The terms "optical" and "light," as referenced throughout this disclosure, are to be understood to encompass any electromagnetic radiation (waves) that can be used in object sensing to facilitate autonomous driving, e.g., distance sensing, velocity sensing, acceleration sensing, rotational motion sensing, and so on. For example, "optical" sensing can utilize a range of light visible to a human eye (e.g., the 380 to 700 nm wavelength range), the UV range (below 380 nm), the infrared range (above 700 nm), the radio frequency range (above 1 m), etc. In implementations, "optical" and "light" can include any other suitable range of the electromagnetic spectrum.

The sensing system 120 can include a radar unit 126, which can be any system that utilizes radio or microwave frequency signals to sense objects within the driving environment 110 of the AV 100. The radar unit can be configured to sense both the spatial locations of the objects (including their spatial dimensions) and their velocities (e.g., using the Doppler shift technology). Hereinafter, "velocity" refers to both how fast the object is moving (the speed of the object) as well as the direction of the object's motion. The term "angular velocity" refers to how fast the object is rotating around some axis as well as the direction of this axis of rotation. For example, a car that is making a left (right) turn has the axis of rotation pointed up (down) and the value of the angular velocity is equal to the rate of change of the angle of rotation (e.g., measured in radians per second).

The sensing system 120 can include one or more LiDAR sensors 122 (e.g., LiDAR rangefinders), which can be a laser-based unit capable of determining distances (e.g., using ToF technology) to the objects in the driving environment 110. The LiDAR sensor(s) 122 can utilize wavelengths of electromagnetic waves that are shorter than the wavelength of the radio waves and can, therefore, provide a higher spatial resolution and sensitivity compared with the radar unit. The LiDAR sensor(s) 122 can include a coherent LiDAR sensor, such as a frequency-modulated continuous wave (FMCW) LiDAR sensor. The LiDAR sensor(s) 122 can use optical heterodyne detection for velocity determination. In some implementations, the functionality of ToF and coherent LiDAR sensor(s) is combined into a single (e.g., hybrid) unit capable of determining both the distance to and the radial velocity of the reflecting object. Such a hybrid unit can be configured to operate in an incoherent sensing mode (ToF mode) and/or a coherent sensing mode (e.g., a mode that uses heterodyne detection) or both modes at the same time. In some implementations, multiple LiDAR sensor(s) 122 can be mounted on AV, e.g., at different locations separated in space, to provide additional information about a transverse component of the velocity of the reflecting object, as described in more detail below.

The LiDAR sensor(s) 122 can include one or more laser sources producing and emitting signals and one or more detectors of the signals reflected back from the objects. The LiDAR sensor(s) 122 can include spectral filters to filter out spurious electromagnetic waves having wavelengths (frequencies) that are different from the wavelengths (frequencies) of the emitted signals. In some implementations, the LiDAR sensor(s) 122 can include directional filters (e.g., apertures, diffraction gratings, and so on) to filter out electromagnetic waves that can arrive at the detectors along directions different from the retro-reflection directions for the emitted signals. The LiDAR sensor(s) 122 can use various other optical components (lenses, mirrors, gratings, optical films, interferometers, spectrometers, local oscillators, and the like) to enhance sensing capabilities of the sensors.

In some implementations, the LiDAR sensor(s) 122 can be 360-degree unit in a horizontal direction. In some implementations, the LiDAR sensor(s) 122 can be capable of spatial scanning along both the horizontal and vertical directions. In some implementations, the field of view can be up to 90 degrees in the vertical direction (so that at least a part of the upper hemisphere is covered by the LiDAR signals). In some implementations, the field of view can be a full sphere (consisting of two hemispheres). For brevity and conciseness, when a reference to "LiDAR technology," "LiDAR sensing," "LiDAR data," and "LiDAR," in general, is made in the present disclosure, such reference shall be understood also to encompass other electromagnetic sensing technology, such as the radar technology, where applicable.

The sensing system 120 can further include one or more cameras 129 to capture images of the driving environment 110. The images can be two-dimensional projections of the driving environment 110 (or parts of the driving environment 110) onto a projecting plane (flat or non-flat, e.g. fisheye) of the cameras. Some of the cameras 129 of the sensing system 120 can be video cameras configured to capture a continuous (or quasi-continuous) stream of images of the driving environment 110. The sensing system 120 can also include one or more sonars 128, which can be ultrasonic sonars, in some implementations.

The sensing data obtained by the sensing system 120 can be processed by a data processing system 130 of AV 100. For example, the data processing system 130 can include a perception system 132. The perception system 132 can be configured to detect and track objects in the driving environment 110 and to recognize the detected objects. For example, the perception system 132 can analyze images captured by the cameras 129 and can be capable of detecting traffic light signals, road signs, roadway layouts (e.g., boundaries of traffic lanes, topologies of intersections, designations of parking places, and so on), presence of obstacles, and the like. The perception system 132 can further receive the LiDAR sensing data (coherent Doppler data and incoherent ToF data) to determine distances to various objects in the environment 110 and velocities (radial and, in some implementations, transverse) of such objects. In some implementations, the perception system 132 can use the LiDAR data in combination with the data captured by the camera(s) 129. In one example, the camera(s) 129 can detect an image of a rock partially obstructing a traffic lane. Using the data from the camera(s) 129, the perception system 132 can be capable of determining the angular size of the rock, but not the linear size of the rock. Using the LiDAR data, the perception system 132 can determine the distance from the rock to the AV and, therefore, by combining the distance information with the angular size of the rock, the perception system 132 can determine the linear dimensions of the rock as well.

In another implementation, using the LiDAR data, the perception system 132 can determine how far a detected object is from the AV and can further determine the component of the object's velocity along the direction of the AV's motion. Furthermore, using a series of quick images obtained by the camera, the perception system 132 can also determine the lateral velocity of the detected object in a direction perpendicular to the direction of the AV's motion. In some implementations, the lateral velocity can be determined from the LiDAR data alone, for example, by recognizing an edge of the object (using horizontal scanning) and further determining how quickly the edge of the object is moving in the lateral direction. In some implementations, the perception system 132 can receive one or more sensor data frames from the sensing system 120. Each of the sensor frames can include multiple points. Each point can correspond to a reflecting surface from which a signal emitted by the sensing system 120 (e.g., by LiDAR sensor(s) 122) is reflected. The type and/or nature of the reflecting surface can be unknown. Each point can be associated with various data, such as a timestamp of the frame, coordinates of the reflecting surface, radial velocity of the reflecting surface, intensity of the reflected signal, and so on. The coordinates can be spherical (or cylindrical) coordinates, in one implementation. For example, the coordinates can include the radial distance, the polar angle (the angle the direction to the respective reflecting surface makes with the vertical direction or a horizontal plane), and the azimuthal angle (the angle indicating the direction within the horizontal plane). The radial distance can be determined from the LiDAR data whereas the angles can be independently known from synchronizer data or clock data, e.g., based on the known frequency of rotation of the transmitter within the horizontal plane. The perception system 132 can use one or more algorithms to process, classify, and filter various sets of points, which can be used by the perception system 132 for efficient and reliable detection and tracking of objects.

The perception system 132 can further receive information from a GPS transceiver (not shown) configured to obtain information about the position of the AV relative to Earth. The GPS data processing module 134 can use the GPS data in conjunction with the sensing data to help accurately determine location of the AV with respect to fixed objects of the driving environment 110, such as roadways, lane boundaries, intersections, sidewalks, crosswalks, road signs, surrounding buildings, and so on, locations of which can be provided by map information 135. In some implementations, the data processing system 130 can receive non-electromagnetic data, such as sonar data (e.g., ultrasonic sensor data), temperature sensor data, pressure sensor data, meteorological data (e.g., wind speed and direction, precipitation data), and the like.

The data processing system 130 can further include an environment monitoring and prediction component 136, which can monitor how the driving environment 110 evolves with time, e.g., by keeping track of the locations and velocities of the animated objects (relative to Earth). In some implementations, the environment monitoring and prediction component 136 can keep track of the changing appearance of the environment due to motion of the AV relative to the environment. In some implementations, the environment monitoring and prediction component 136 can make predictions about how various animated objects of the driving environment 110 will be positioned within a prediction time horizon. The predictions can be based on the current locations and velocities of the animated objects as well as on the tracked dynamics of the animated objects during a certain (e.g., predetermined) period of time. For example, based on stored data for object 1 indicating accelerated motion of object 1 during the previous 3-second period of time, the environment monitoring and prediction component 136 can conclude that object 1 is resuming its motion from a stop sign or a red traffic light signal. Accordingly, the environment monitoring and prediction component 136 can predict, given the layout of the roadway and presence of other vehicles, where object 1 is likely to be within the next 3 or 5 seconds of motion. As another example, based on stored data for object 2 indicating decelerated motion of object 2 during the previous 2-second period of time, the environment monitoring and prediction component 136 can conclude that object 2 is stopping at a stop sign or at a red traffic light signal. Accordingly, the environment monitoring and prediction component 136 can predict where object 2 is likely to be within the next 1 or 3 seconds. The environment monitoring and prediction component 136 can perform periodic checks of the accuracy of its predictions and modify the predictions based on new data obtained from the sensing system 120.

In some implementations, the environmental monitoring and prediction component 136 may utilize a probabilistic overlap module 137 to compute probabilistic overlaps between the AV and an agent state of nearby objects in order to estimate the risk of collisions between the AV and the objects. In some implementations, the probabilistic overlap module 137 computes and caches a probabilistic overlap between the AV and objects identified, for example, by the perception system 132. The probabilistic overlap module 137 may further compute uncertainty in positions of the objects based on the cached probabilistic overlap in response to queries received, for example, from an AV control system (AVCS) 140 (described in greater detail below). Some aspects of the functionality of and modeling utilized by the probabilistic overlap module 137 are described in greater detail below with respect to FIGS. 4-10.

The data generated by the perception system 132, the GPS data processing module 134, and the environment monitoring and prediction component 136 can be used by an autonomous driving system, such as the AV control system (AVCS) 140. The AVCS 140 can include one or more algorithms that control how AV is to behave in various driving situations and environments. For example, the AVCS 140 can include a navigation system for determining a global driving route to a destination point. The AVCS 140 can also include a driving path selection system for selecting a particular path through the immediate driving environment, which can include selecting a traffic lane, negotiating a traffic congestion, choosing a place to make a U-turn, selecting a trajectory for a parking maneuver, and so on. The AVCS 140 can also include an obstacle avoidance system for safe avoidance of various obstructions (rocks, stalled vehicles, a jaywalking pedestrian, and so on) within the driving environment of the AV. The obstacle avoidance system can be configured to evaluate the size of the obstacles and the trajectories of the obstacles (if obstacles are animated) and select an optimal driving strategy (e.g., braking, steering, accelerating, etc.) for avoiding the obstacles.

Algorithms and modules of AVCS 140 can generate instructions for various systems and components of the vehicle, such as the powertrain and steering 150, vehicle electronics 160, signaling 170, and other systems and components not explicitly shown in FIG. 1. The powertrain and steering 150 can include an engine (internal combustion engine, electric engine, and so on), transmission, differentials, axles, wheels, steering mechanism, and other systems. The vehicle electronics 160 can include an on-board computer, engine management, ignition, communication systems, carputers, telematics, in-car entertainment systems, and other systems and components. The signaling 170 can include high and low headlights, stopping lights, turning and backing lights, horns and alarms, inside lighting system, dashboard notification system, passenger notification system, radio and wireless network transmission systems, and so on. Some of the instructions output by the AVCS 140 can be delivered directly to the powertrain and steering 150 (or signaling 170) whereas other instructions output by the AVCS 140 are first delivered to the vehicle electronics 160, which generate commands to the powertrain and steering 150 and/or signaling 170.

In one example, the AVCS 140 can determine that an obstacle identified by the data processing system 130 is to be avoided by decelerating the vehicle until a safe speed is reached, followed by steering the vehicle around the obstacle. The AVCS 140 can output instructions to the powertrain and steering 150 (directly or via the vehicle electronics 160) to (1) reduce, by modifying the throttle settings, a flow of fuel to the engine to decrease the engine rpm, (2) downshift, via an automatic transmission, the drivetrain into a lower gear, (3) engage a brake unit to reduce (while acting in concert with the engine and the transmission) the vehicle's speed until a safe speed is reached, and (4) perform, using a power steering mechanism, a steering maneuver until the obstacle is safely bypassed. Subsequently, the AVCS 140 can output instructions to the powertrain and steering 150 to resume the previous speed settings of the vehicle.

Figure 2:
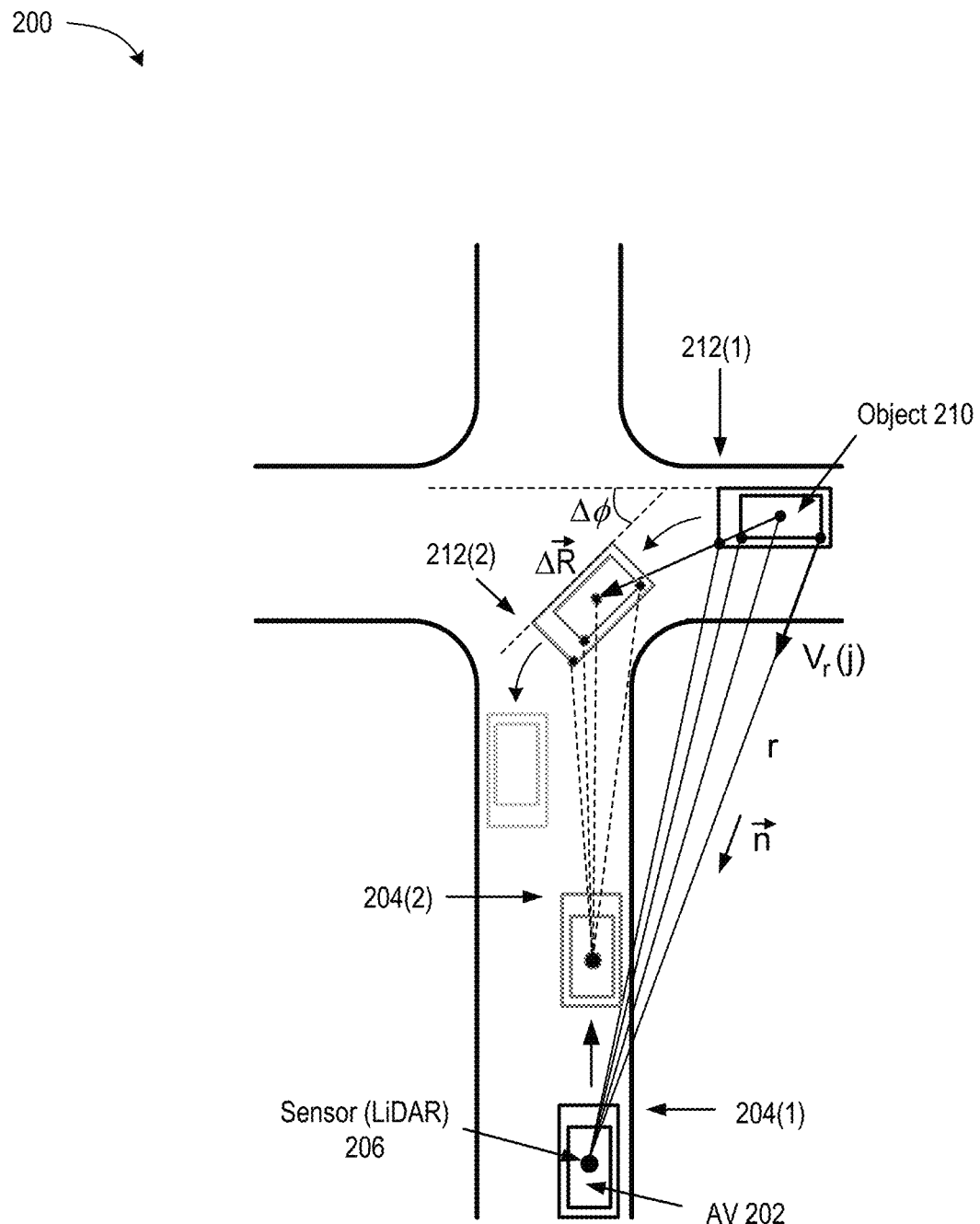
FIG. 2 is an illustration of a Doppler-assisted object identification and tracking setup that utilizes velocity reconstruction, as part of a perception system of an autonomous vehicle, in accordance with some implementations of the present disclosure.

FIG. 2 is an illustration 200 of a Doppler-assisted object identification and tracking setup that utilizes velocity reconstruction, as part of a perception system of an autonomous vehicle, in accordance with some implementations of the present disclosure. Depicted in FIG. 2 is AV 202 (which can be AV 100 or any other AV) approaching an intersection. The AV 202 has a sensor 206, which can be a LiDAR, such as a coherent LiDAR, an FMCW LiDAR, a hybrid coherent/ToF LiDAR, a combination of a coherent and incoherent LiDAR. etc., or any other device that allows to sense the radial velocity information in addition to the range (distance) information (e.g., the LiDAR sensor(s) 122). The sensor 206 performs scanning of the driving environment of AV 202. In particular, the sensor 206 can sense multiple return points for each sensing frame. The sensing frames can be separated by time increments M. The time increments refer to time differentials between signals emitted into (or returned from) the same direction, as different directions can be probed with signals at slightly different times. More specifically, $\Delta\tau$ can be a duration of the sensor (e.g., LiDAR transmitter) cycle (e.g., a period of revolution of the sensor's transmitter); with N points around the full 360-degree horizontal view, so that any two adjacent directions of sensing can be probed with the time lead/lag of $\Delta\tau/N$.

An object 210 (e.g., a car, a truck, a bus, a motorcycle, or any other object) can be approaching the intersection and making a left turn, as depicted in FIG. 2. Two consecutive locations of AV, e.g., 204(1) and 204(2), corresponding to two consecutive LiDAR frames taken at times $\tau$ and $\tau+\Delta\tau$ are shown. Similarly, the locations of object 210 for the two frames $\tau$ and $\tau+\Delta\tau$ are shown as 212(1) and 212(2), respectively.

It should be understood that the displacement of AV 202 and object 210 shown in FIG. 2 between two consecutive frames is exaggerated for illustrative purposes and that, in reality, various objects can change their locations over the time increment $\Delta\tau$ much less significantly than depicted. For example, there can be numerous frames obtained by sensor 206 while object 210 completes the left-hand turn depicted in FIG. 2.

Object 210 performs a combination of a translational motion and a rotational motion. For example, some reference point of the object 210 is translated by vector $\Delta\vec{R}$ and the object 210 is rotated around this reference point by angle $\Delta\phi$. In a flat driving environment, it can be sufficient to describe rotational motion via a single-component value AO, but in non-flat 3D (in particular, flying or nautical) environments, the rotation angle can be a vector $\Delta\vec{\phi}$ whose three components describe pitch angle, yaw angle, and roll angle, respectively. The angular velocity of the object 210 characterizes the rate at which the object 210 is rotating (turning), $\vec{\Omega}=\Delta\vec{\phi}/\Delta\tau$. The linear velocity of the reference point similarly determines the rate at which the object 210 is translating, $\vec{V}=\Delta\vec{R}/\Delta\tau$. Provided that the object 210 is rigid, the knowledge of the angular velocity $\vec{\Omega}$ and the linear velocity $\vec{V}$ of some reference point O (with coordinates $\vec{R}_O$) can enable determination of the velocity of other points.

As shown in FIG. 2, at location 212(1) object 210 can reflect a number of signals (indicated by solid lines) output by the sensor 206 and generate a number of return points (shown with black circles) of the first frame. The return points should be understood as data entries (e.g., indexed by the angular directions of the output signals, or in any other way) generated by the perception system 132 based on the measurements performed by sensor 206, as part of the sensing system 120. Each return point can include: (1) distance r to the actual physical reflecting region, and (2) the radial velocity $V_r(j)$ that is equal to the component of the velocity $\vec{V}(j)$, associated with the j-th point. The radial velocity is the component of the vector velocity along the direction (described by unit vector $\vec{n}$) towards (or away from) the sensor 206: $V_r(j)=\vec{V}(j)\cdot\vec{n}$. In some implementations, only some of the return points can include the radial velocity values. For example, while ToF range measurements can be performed for each return point, only some (e.g., every fifth, tenth, and so on) of the points can be probed with the coherent LiDAR and include the velocity data. The radial velocity $V_r(j)$ is the velocity measured in the reference frame of the AV 202. Accordingly, because in a general case the AV 202 is also moving, the measured velocity $V_r(j)$ can be different from the velocity of the respective physical point of reflection relative to the ground, which can then be determined by adding (in vector form) the velocity of the object 210 measured in the AV 202 frame to the velocity of the AV 202 with respect to the ground (which can be known independently, e.g., from speedometer/odometer data, map/GPS data, etc.).

At location 212(2), the object 220 can similarly reflect a new set of signals (indicated by dashed lines) output by the sensor 206 and generate a number of return points of the second frame. One or more mapping algorithms implemented by perception system 132 can determine a geometric transformation that maps the point cloud of the first frame onto the point cloud of the second frame. Such mapping can use the ICP algorithm which iteratively revises the transformation and minimizes an error metric (e.g., the mean squared error or some other pre-determined metric) based on the comparison of the transformed first point cloud with the second point cloud (or vice versa). In some implementations, other mapping algorithms can be used, such as the Kabsch algorithm, the Procrustes superimposition, and the like. Although only two sensing frames (with respective points clouds) are depicted for conciseness, similar mappings can be generated between various consecutive sensing frames (e.g., between the second frame and the third frame, between the third frame and the fourth frame, etc.) for both object identification and tracking.

As the object 210 travels, moving from location 212(1) to location 212(2), the return points in the second frame correspond to reflection surfaces of the object 210 that may be different from the surfaces causing reflections of the signals of the first frame. For example when parts of the rotating object 210 previously obscured come within a field of view of sensor 206, additional return points can be detected. Conversely, some of the previously exposed return points can be absent (as the respective physical reflecting surfaces disappear from view), and so on. To address such dynamic aspects of point clouds, the algorithms executed by perception system 132 can determine bounding boxes of various identified objects, which can be three-dimensional (3D) bounding boxes.

Figure 3:
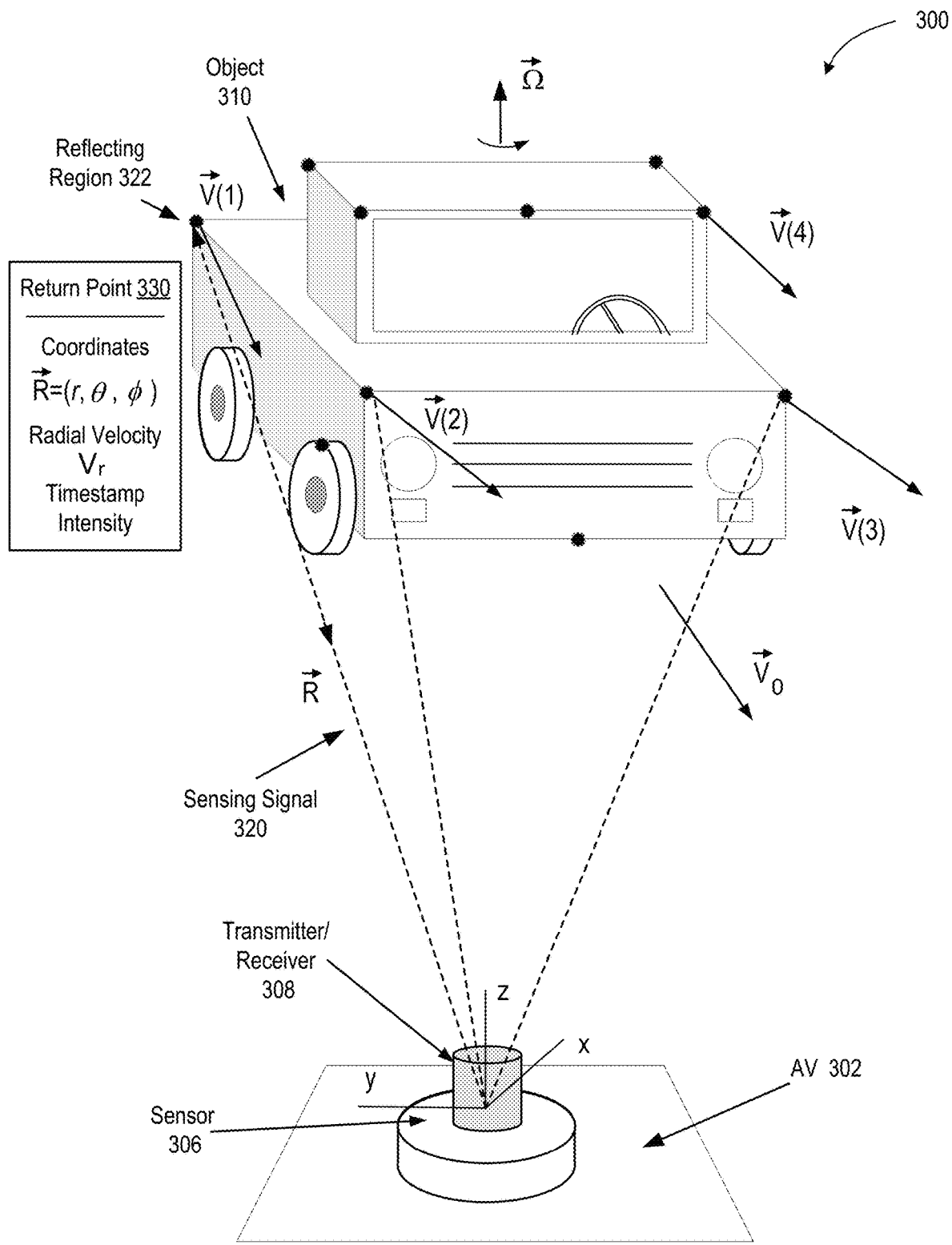
FIG. 3 is an illustration of a velocity reconstruction setup, as part of a perception system of an autonomous vehicle, in accordance with some implementations of the present disclosure.

FIG. 3 is an illustration 300 of a velocity reconstruction setup, as part of a perception system of an autonomous vehicle, in accordance with some implementations of the present disclosure. Depicted is an object 310 (e.g., a car, a truck, etc.) that is moving with some translational velocity $\vec{V}_O$ (e.g. moving forward) while simultaneously rotating with angular velocity $\vec{\Omega}$ (e.g., making a left turn). Also shown is a part of the AV 302 with a sensor 306 mounted thereon. Sensor 306 can include a rotating transmitter/receiver 308 capable of transmitting and receiving sensing (e.g., laser, radar, etc.) signals that scan the outside (relative to AV 302) environment. One sensing frame that corresponds to a single cycle of the transmitter/receiver 308 can produce multiple return points from various reflecting regions (depicted with black circles) of the object 310.

A sensing signal 320 can be emitted by a transmitting circuit of the transmitter/receiver 308, reflect from a reflecting region 322 of the object 310, return along the same path and be received by a receiving circuit of the transmitter/receiver 308. The sensing system 120 can associate a return point 330 with the sensing signal 320 and/or reflecting region 322. The return point 330 can include various data that can be extracted from the sensing signal 320, such as the coordinates (which can be in any appropriate system of coordinates, e.g., Cartesian coordinates $\vec{R}=(x, y, z)$, spherical coordinates $\vec{R}=(r, \theta, \phi)$, cylindrical coordinates $\vec{R}=(r, \phi, z)$, or any other system of coordinates); the origin of the coordinate system can be associated with the transmitter/receiver 308, as shown. The return point can also include such data as the radial velocity $V_r$, a timestamp $\tau$ associated with the sensing signal 320 (e.g., the time of the signal emission or return), the intensity of the returned signal, and other information such as the polarization of the emitted and/or received signal, and the like. Although only the data associated with the return point 330 is depicted in FIG. 3, other return points associated with the reflecting regions depicted with black circles can include the same or similar type of information. Because the object 310 can be rotating, the velocities of each of the reflecting regions, $\vec{V}(1), \vec{V}(2), \vec{V}(3), \vec{V}(4) \ldots$, can be different from each other. Correspondingly, the detected radial velocities associated with each return point, $V_r(1), V_r(2), V_r(3), V_r(4) \ldots$, can likewise be different from each other.

Specifically, if the object 310 is a rigid body, the velocity of an element of the object having a radius-vector $\vec{R}$ can be found from the rigid body equation:

$$\vec{V}=\vec{V}_O+\vec{\Omega}\times(\vec{R}-\vec{R}_{O'}),$$

where $\vec{R}_O$ is the radius vector of some reference point. The reference point can be any element of the object, e.g. an element associated with the return point (3) or any other return point. The choice of the reference point O can be arbitrary since the same rigid body equation exists for any other reference point O', as $$\vec{V}=\vec{V}_O+\vec{\Omega}\times(\vec{R}-\vec{R}_O-\vec{R}_O+\vec{R}_{O'})$$

$$=\vec{V}_{O'}+\vec{\Omega}\times(\vec{R}-\vec{R}_{O'}),$$

where $\vec{V}_{O'}=\vec{V}_O+\vec{\Omega}\times(\vec{R}_{O'}-\vec{R}_O)$ is the linear velocity of the other reference point O'. Although the linear velocity changes when the reference point is changed, the angular velocity is independent of the choice of the reference point. This independence provides additional flexibility by enabling to choose the reference point based on convenience (e.g., near the center of the cluster of points detected by the sensing system 120).

Figure 4:
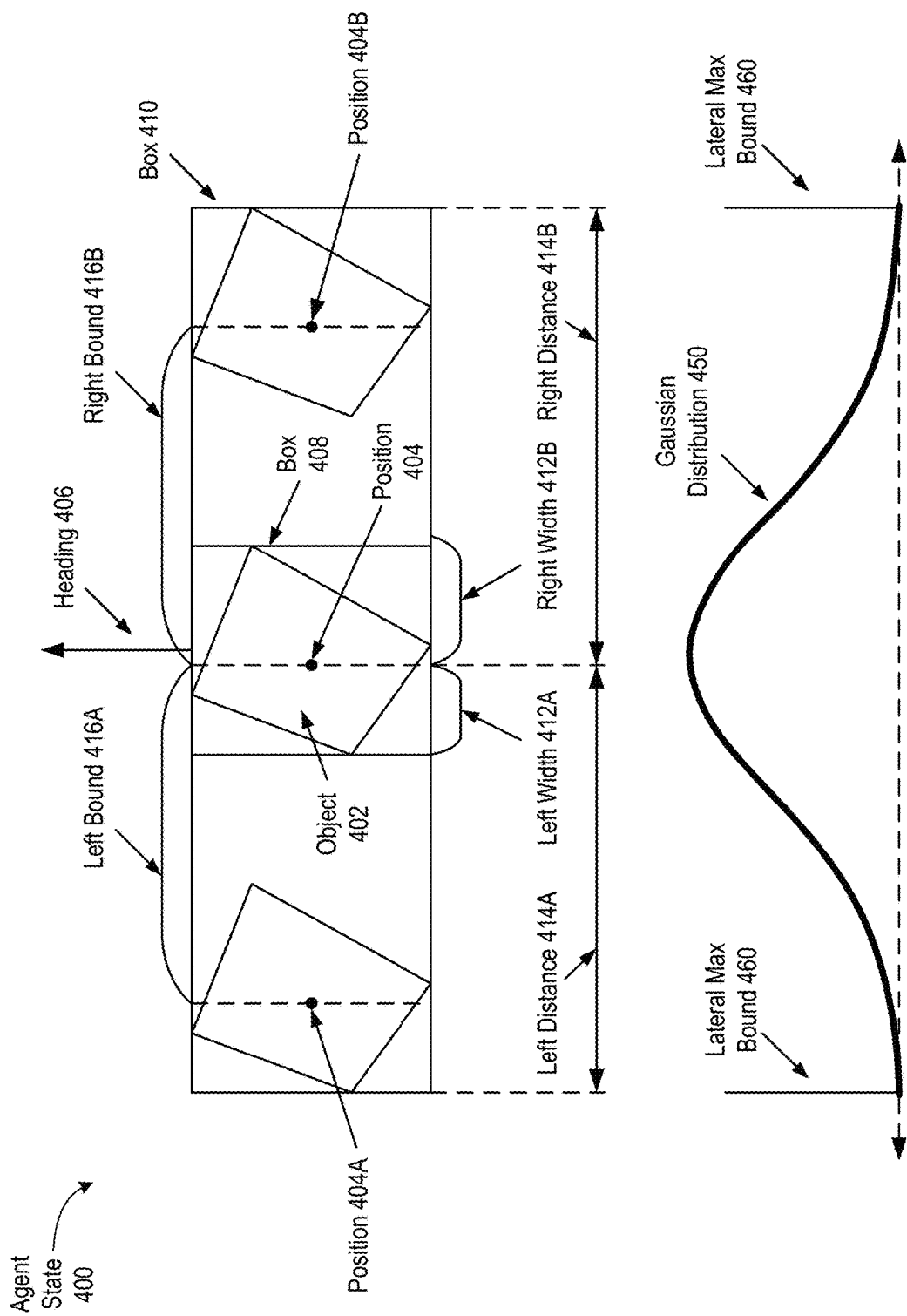
FIG. 4 is an illustration of an agent state representative of an object in accordance with some implementations of the present disclosure.

Aspects of the functionality of the probabilistic overlap module 137, as implemented by the environment monitoring and prediction component 136, is now described. FIG. 4 is an illustration of an agent state 400 representative of an object 402 in accordance with some implementations of the present disclosure. The dimensions of the object 402 correspond to a top-down view of the object 402 showing its lateral and longitudinal dimensions. The vertical height of the object 402 is not illustrated to avoid obscuring the drawing. In some implementations, the object 402 may be a convex polygon of an arbitrary shape with an arbitrary number of vertices. For example, the object 402 is depicted as an irregularly-shaped polygon with four vertices for illustrative purposes. In some implementations, a nominal position 404 of the object 402 may correspond to an estimated center of mass of the object 402. In some implementations, a direction of motion of the object 402 may be represented as a heading 406 of the agent state 400. In some implementations, the heading 406 may coincide with the nominal position 404 of the object, or may coincide with a central longitudinal axis of a bounding box 410 of the agent state 400 (as illustrated).

In some implementations, the bounds of the object 402 may be represented by a bounding box 408 characterized by a left width 412A and a right width 412B defined based on the nominal position 404. A total lateral width of the bounding box 410 is defined as the sum of a left distance 414A and a right distance 414B. The left distance 414A can be computed as a sum of the left width 412A and a left bound 416A (a distance between the nominal position 404 and a leftmost nominal position 404A). Similarly, the right distance 414B can be computed as a sum of the right width 412B and a right bound 416B (a distance between the nominal position 404 and a rightmost nominal position 404B). In some implementations, an uncertainty in the lateral position of the object 402 ("lateral uncertainty") is modeled as a Gaussian distribution 450 spanning lateral maximum bounds 460 such that a cumulative probability of the Gaussian distribution 450 between the lateral maximum bounds 460 is approximately equal to 1. In some implementations, the Gaussian distribution 450 is centered at the nominal position 404, with the total lateral width of the bounding box 410 (i.e., the sum of the left distance 414A and the right distance 414B) corresponding to the lateral maximum bounds 460 of the Gaussian distribution 450. Uncertainty in the longitudinal position of the object 402 ("longitudinal uncertainty") may be modeled in a similar fashion (not shown), for example, by modeling as a Gaussian distribution spanning longitudinal maximum bounds along the central longitudinal axis (i.e., parallel to the heading 406 of the agent state 400). By modeling the lateral and longitudinal uncertainties of the agent state 400 in this way, the outermost edges of the object 402 along the lateral direction (i.e., orthogonal to the heading 406) and the longitudinal direction (i.e., parallel to the heading 406) are expected to remain within the bounding box 410.

FIG. 5A illustrates an AV trajectory 500 as a series of overlapping states in accordance with some implementations of the present disclosure. Each of AV states 502A, 502B, and 502C represent, for example, positions and orientations of the AV (which may be the same as or similar to AV 202) at different points in time, with the AV state 502A being the earliest point in time and the AV state 502C being the latest point in time. In some implementations, at least a portion of each AV state may overlap. For example, an overlap region 504A exists between the AV state 502A and the AV state 502B, and an overlap region 504B exists between the AV state 502B and the AV state 502C. In some implementations, the shape of the various AV states is representative of the physical dimensions of the AV. In some implementations, the shape of the various AV states is a simple rectangular structure, which may be defined to enclose the physical geometry of the AV (e.g., similar to the bounding box 408 of the object 402). An AV state may be simply referred to as the AV in the context of computing probabilistic overlaps discussed herein.

FIG. 5B illustrates an agent state 510 overlapping with the AV trajectory 500 in accordance with some implementations of the present disclosure. The agent state 510 may be characterized by a bounding box 512 (e.g., which may be the same as or similar to the bounding box 408) and a heading 514 (e.g., which may be the same as or similar to the heading 406). As illustrated, an overlap region 516 exists where the agent state 510 overlaps with the AV state 502B. In some implementations, the overlap region 516 is in the shape of a parallelogram, for example, when the agent state 510 and the AV state 502B are modeled as rectangular boxes. In some implementations, different agent states at different times may overlap with the various AV states differently (partial overlap or smaller/larger overlap area) or not at all. It is noted that FIG. 5B provides an exaggerated view to show maximum overlap between the agent state 510 and the AV state 502B.

Figure 6A:
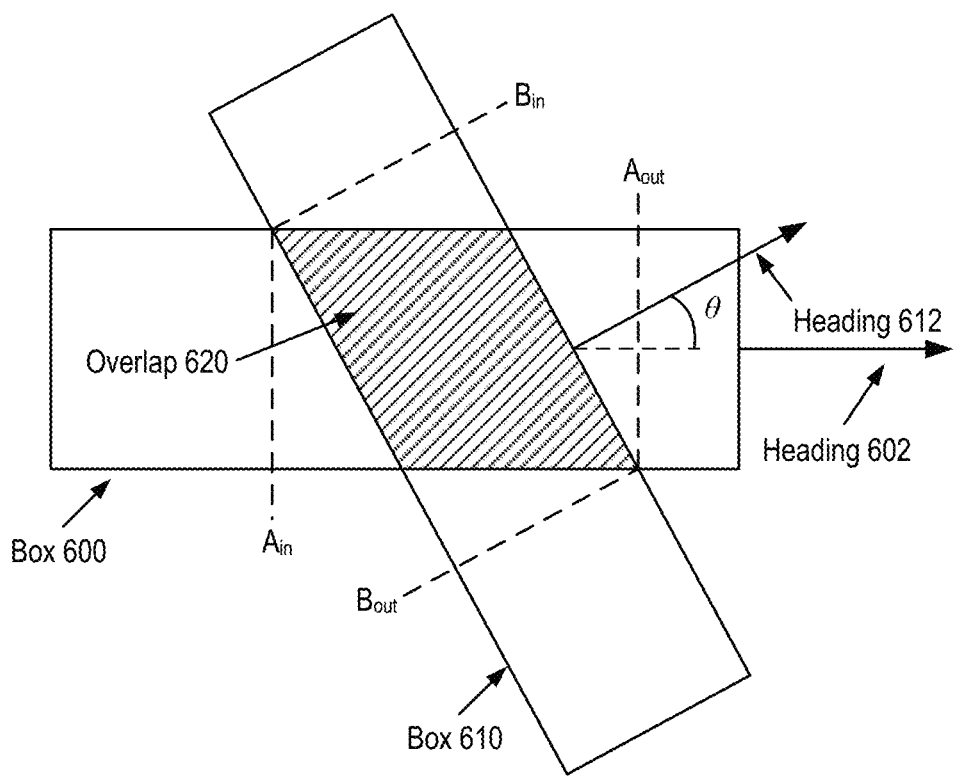
FIG. 6A illustrates geometric parameters of overlap between an AV and an agent state in accordance with some implementations of the present disclosure.

FIG. 6A illustrates geometric parameters of overlap between an AV and an agent state in accordance with some implementations of the present disclosure. The AV is represented by box 600 having a heading 602, and the agent state is represented by box 610 having a heading 612. In some implementations, an angle θ is defined as the angle between the heading 612 and a lateral axis of the box 600. An overlap region 620 can be computed between box 600 and box 610, which corresponds to the edges of each box that are orthogonal to their respective headings. Moving from left to right along the box 600, the lateral bound at which the overlap region 620 is first encountered by the box 600 is denoted as $A_{in}$, and the lateral bound at which the overlap region 620 no longer overlaps the box 600 is denoted as $A_{out}$. Similarly, moving from top to bottom along the box 610, the lateral bound at which the overlap region 620 is first encountered by the box 610 is denoted as $B_{in}$, and the lateral bound at which the overlap region 620 no longer overlaps the box 610 is denoted as $B_{out}$.

Figure 6B:
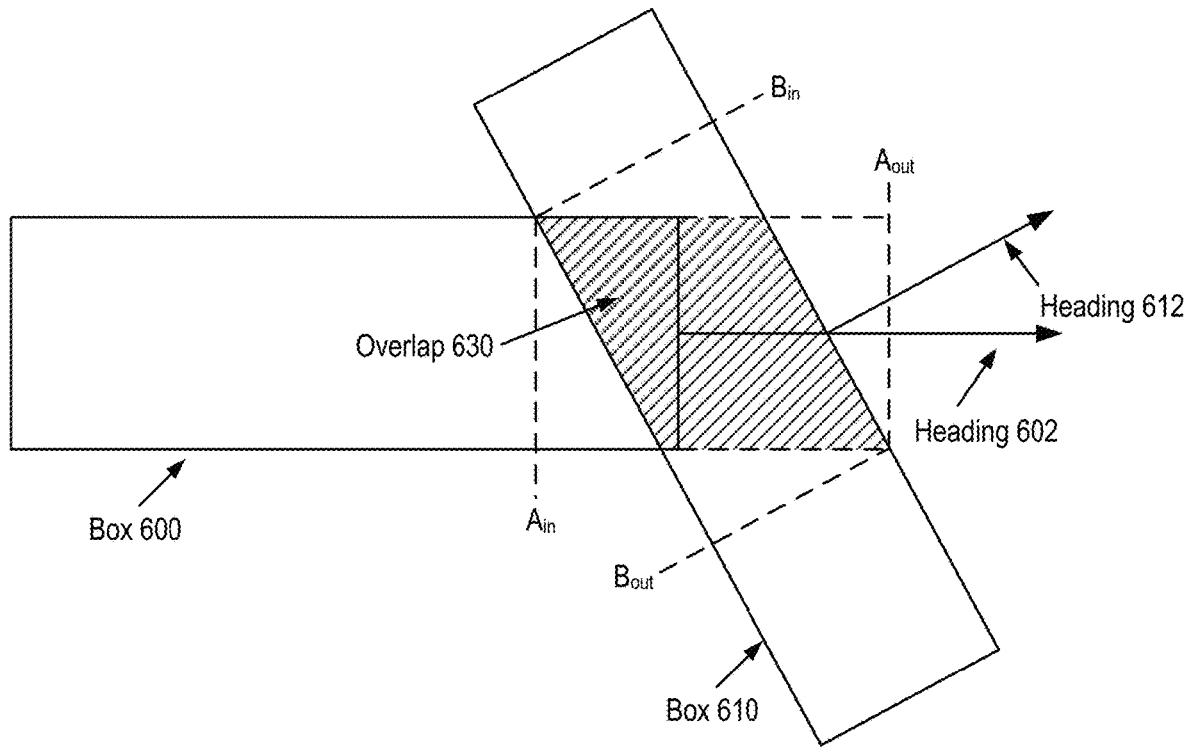
FIG. 6B illustrates geometric parameters for partial overlap between the AV and the agent state in accordance with some implementations of the present disclosure.

In some implementations, an overlap 630 may be similarly computed in the case of partial overlap between the box 600 and the box 610, as illustrated in FIG. 6B. For example, $A_{out}$ is not bounded within the box 600, and is instead extrapolated out of the bounds of the box 600 based on the parallelogram geometry of the overlap 630.

In some implementations, the lateral bounds $B_{in}$ and $B_{out}$ denote the minimum and maximum lateral shifts that the box 610 could overlap with the box 600. In implementations where the lateral uncertainty of the agent state is modeled as a Gaussian distribution, the overlap probability can be computed using the cumulative distribution between $B_{in}$ and $B_{out}$ with the full width of the distribution (e.g., denoted by the lateral maximum bounds 460) corresponding to the total lateral width of the box 610. Based on the overlap of the box 610 with the box 600 (between $A_{in}$ and $A_{out}$), the range between $B_{in}$ and $B_{out}$ illustrated by the overlap 620 or the overlap 630 represents the maximum overlap likelihood. The overlap 620 and the overlap 630 can be cached for later use to accelerate further computations.

Figure 6C:
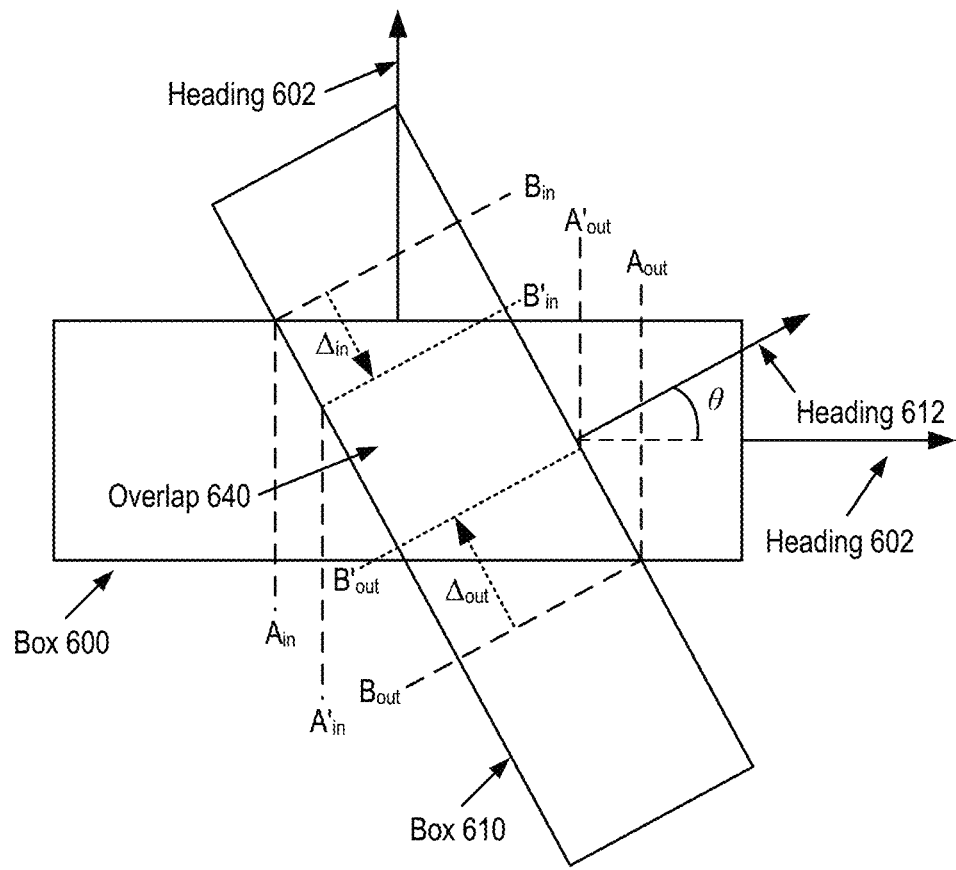
FIG. 6C illustrates a first example of interpolation of the overlap region based on updated lateral bounds of the agent state in accordance with some implementations of the present disclosure.

FIG. 6C illustrates interpolation of the overlap region 640 based on updated lateral bounds of the agent state in accordance with some implementations of the present disclosure. The updated lateral bounds for the box 610, from which an overlap can be calculated with respect to the box 600, are denoted by $B'_{in}$ and $B'_{out}$, and are related to the original lateral bounds according to $B'_{in}=B_{in}+\Delta_{in}$ and $B'_{out}=B_{out}-\Delta out$. For the scenario where $B'_{in}$ and $B'_{out}$ each do not cross corners of the opposite edges of the original overlap 620 (an example of which is illustrated in FIG. 6D), the new lateral bounds enclosing the overlap region for the box 600, namely $A'_{in}$ and $A'_{out}$, can be computed based on the angle θ according to:

$$A'_{in}=A_{in}+\Delta_{in}\cdot\sin\theta, \text{ and}$$

$$A'_{out}=A_{out}-\Delta out\cdot\sin\theta.$$

Figure 6D:
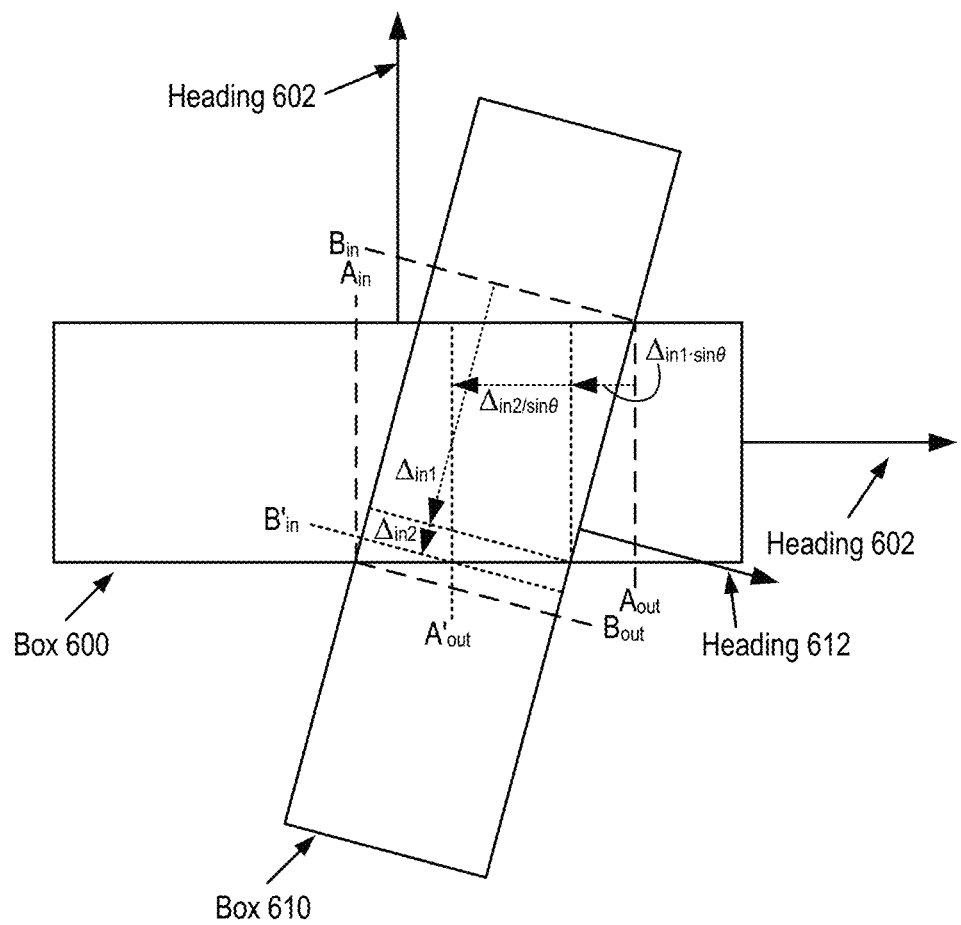
FIG. 6D illustrates a second example of interpolation of the overlap region based on updated lateral bounds of the agent state in accordance with some implementations of the present disclosure.

FIG. 6D illustrates two-step interpolation in accordance with some implementations of the present disclosure. In this scenario, $B_{in}$ is moved close to $B_{out}$ such that $B'_{in}$ extends past a lower corner of the original overlap region. The transformation can be expressed as $B'_{in}=B_{in}+\Delta_{in}1+\Delta_{in}2$, since $\Delta_{in}=\Delta_{in}1+\Delta_{in}2$. The lateral bounds $A_{out}$ and $B_{out}$ are unchanged in this example, and are thus equal to $A'_{out}$ and $B'_{out}$, respectively. The lateral bound $A'_{out}$ can be expressed as $A'_{out}=A_{out}-\Delta_{in}1\cdot\sin\theta-\Delta_{in}2/\sin\theta$.

Figure 7:
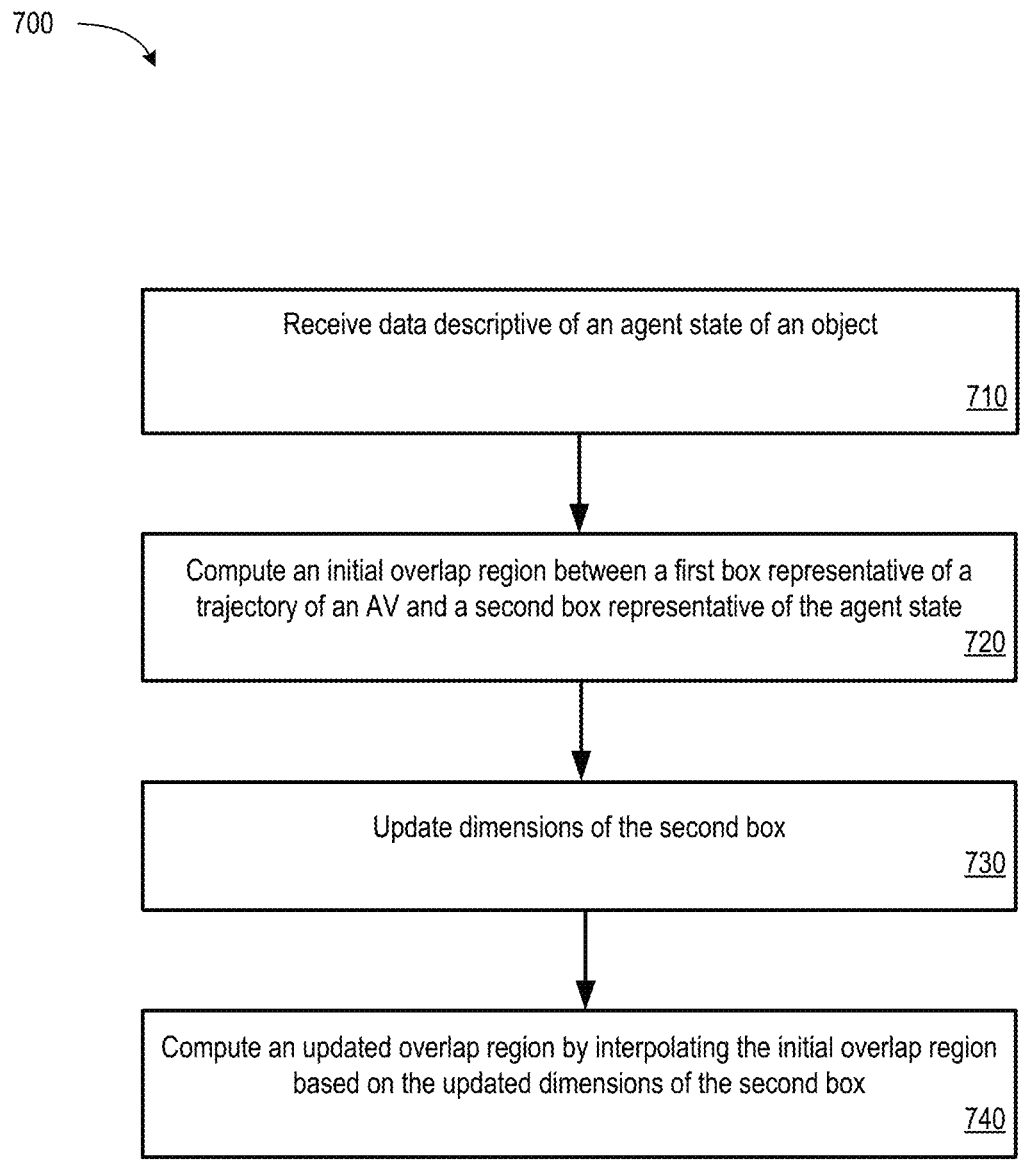
FIG. 7 depicts a flow diagram of an example method of using a box-shaped probabilistic overlap module to control a trajectory of an AV in accordance with some implementations of the present disclosure.

FIG. 7 depicts a flow diagram of an example method 700 of using a box-shaped probabilistic overlap module to control a trajectory of an AV in accordance with some implementations of the present disclosure. The method 700 described below and/or each of its individual functions, routines, subroutines, or operations can be performed by a processing device, having one or more processing units (CPU) and memory devices communicatively coupled to the CPU(s). The processing device executing the method 700 can perform instructions from various components of the environment monitoring and prediction component 136, e.g., the probabilistic overlap module 137. In certain implementations, the method 700 can be performed by a single processing thread. Alternatively, the method 700 can be performed by two or more processing threads, each thread executing one or more individual functions, routines, subroutines, or operations of the method 700. In an illustrative example, the processing threads implementing the method 700 can be synchronized (e.g., using semaphores, critical sections, and/or other thread synchronization mechanisms). Alternatively, the processing threads implementing the method 700 can be executed asynchronously with respect to each other. Various operations of the method 700 can be performed in a different order compared with the order shown in FIG. 7. Some operations of the method can be performed concurrently with other operations. Some operations can be optional.

Referring now to FIG. 7, the method 700 begins at block 710, where a data processing system of an AV (e.g., the data processing system 130) receives data descriptive of an agent state of an object (e.g., the agent state 510), which may be one of many agent states that model a trajectory of the object. In some implementations, the data descriptive of the agent state comprises data descriptive of a position and an orientation (e.g., heading 514) of the agent state. In some implementations, the data descriptive of the agent state further comprises a speed of the agent state, which may correlate with an uncertainty in the object's position. In some implementations, the data descriptive of the agent state corresponds to a particular frame at which the object is observed, and may be generated by an environment monitoring and prediction component (e.g., the environment monitoring and prediction component 136). In some implementations, the data processing system further receives data descriptive of a path of the AV, from which a trajectory of the AV can be modeled by a plurality of boxes to approximate swept volume of the path (e.g., the AV trajectory 500). The data descriptive of the path of the AV can include physical dimensions of the AV as well as position and orientation data of the AV along the path.

At block 720, the data processing system computes an initial overlap region between a first box representative of the trajectory of the AV (e.g., the box 600) and a second box representative of the agent state (e.g., the box 610). In some implementations, the initial overlap region (e.g., the overlap 620) is representative of an overlap probability between the AV and the agent state. In one implementation, lateral dimensions of the second box (e.g., dimensions spanned by the sum of the left distance 414A and the right distance 414B) are representative of uncertainty in a lateral position of the object. In some implementations, the lateral dimensions of the second box are selected to result in a parallelogram shape for the initial overlap region. For example, an area of the parallelogram is representative of maximum cumulative uncertainty in the lateral position of the agent state. The dimensions of the parallelogram may be computed, for example, based on the lateral bounds $A_{in}$ and $A_{out}$ of the AV (e.g., box 600) and on the lateral bounds $B_{in}$ and $B_{out}$ of the agent state (e.g., box 610), as illustrated and described with respect to FIGS. 6A-6D.

At block 730, the data processing system updates dimensions of the second box (e.g., the lateral bounds $B_{in}$ and/or $B_{out}$ of the box 610). In some implementations, the data processing system updates the dimensions of the second box by increasing or reducing lateral dimensions of the second box (e.g., reducing $B_{in}$ to $B'_{in}$ and/or $B_{out}$ to $B'_{out}$). In some implementations, the dimensions of the second box are updated responsive to the data processing system receiving a query from an AV control system (e.g., the AVCS 140). For example, the query can indicate a level of risk tolerance with respect to the agent state. The level of risk tolerance, for example, may be represented as a standard deviation of a Gaussian distribution, with one or more of the lateral bounds of the agent state being shifted to a particular lateral location corresponding to the standard deviation. In some implementations, the query may specify a single lateral bound to update, for example, if the AV control system seeks to determine whether maneuvering the AV in a particular direction with respect to the object is feasible. In such implementations, the AV control system may cause the AV to maneuver in that direction if a lateral uncertainty is reduced as a result. In some implementations, a change in one or more of the lateral bounds of the agent state can range from 0.1 meters to about 2 meters.

At block 740, the data processing system computes an updated overlap region by interpolating the initial overlap region based on the updated dimensions of the second box. In some implementations, the data processing system interpolates the initial overlap region by rescaling the initial overlap region using the reduced lateral dimensions of the second box to update the overlap region. For example, the interpolation may be performed as described with respect to FIGS. 6C and 6D, for which $A'_{in}$ and $A'_{out}$ are algebraically computed and used to compute or estimate the overlap region.

In some implementations, the data processing system transmits to, for example, the AV control system data representative of uncertainty in a lateral position of the object computed based on a relationship between the updated overlap region and the initial overlap region. In some implementations, the AV control system is to modify the driving path or speed of the AV based on the data representative of the uncertainty in the lateral position. In some implementations, the relationship between the updated overlap region and the initial overlap region is a ratio of an area of the updated overlap region to an area of the original overlap region so as to normalize the area of the updated overlap region.

In certain implementations, method 700 can continue with an AV control system (e.g., the AVCS 140) causing a driving path or speed of the AV to be determined in view of the identified objects and one or more computed probabilistic overlaps. For example, the perception system could have identified an object moving with the speed of 20 mph while making a left-hand turn with the radius of 15 m and communicated this information to the AV control system. The AV control system can then determine, based at least partially on lateral uncertainty of the object's position, that the AV is about to enter the same intersection before the object can complete the turn. The AV control system can determine a new path and/or speed for the AV, which can include braking, changing lanes, stopping, backing up, and so on. The control system can subsequently output instructions to powertrain and steering 150, vehicle electronics 160, signaling 170, etc., to ensure that the AV follows the determined driving path. In certain implementations, the computed probabilistic overlaps may be utilized to compute a risk associated with one or more paths to be taken by the AV, which may result in the selection of a path corresponding to the lowest risk.

Figure 8:
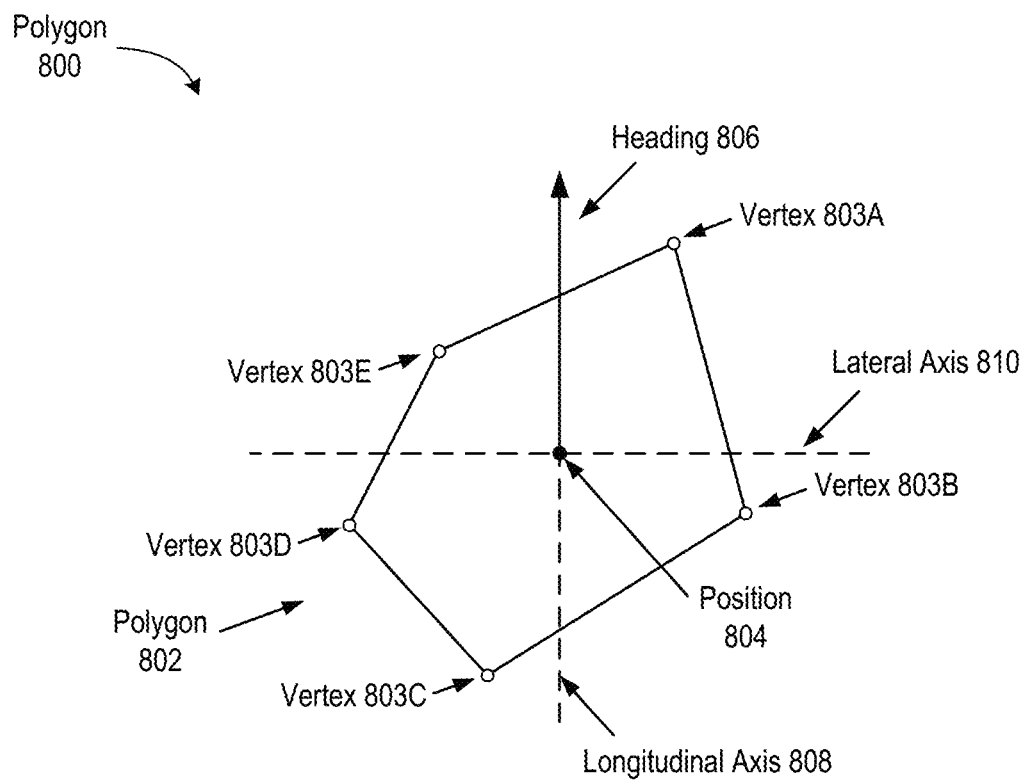
FIG. 8 illustrates an exemplary polygon representative of an agent state of an object or a probabilistic overlap region in accordance with some implementations of the present disclosure.

FIG. 8 illustrates an exemplary polygon 800 in accordance with some implementations of the present disclosure. In some implementations, the polygon 800 is representative of an agent state of an object. In other implementations, the polygon 800 may also correspond to an initial overlap region between a first polygon representative of the trajectory of the AV and a second box representative of an agent state. The polygon 800 is defined by vertices 803A-803E, though it is to be understood that more or less vertices may be present. The polygon 800 is depicted as an irregularly-shaped convex polygon for illustrative purposes. In some implementations, the polygon 800 may be a concave polygon. In some implementations, a position 804 of the polygon 800 may correspond to an estimated center of mass of an agent state. In some implementations, the position 804 corresponds to a geometric center of the polygon 800. In some implementations, a direction of motion of the agent state may be represented as a heading 806. In some implementations, the heading 806 may coincide with a central longitudinal axis of a bounding box of the polygon 800 (as illustrated).

Longitudinal axis 808 and lateral axis 810 are illustrated as orthogonal axes, with the longitudinal axis 808 being aligned with the heading 806, though the longitudinal axis 808 need not be aligned with the heading 806. In general, any axis may be utilized as a search direction for the purpose of identifying extreme vertices of the polygon 802 along that direction. In some implementations, the extreme vertices are identified along the longitudinal axis 808 and the lateral axis 810 when the longitudinal axis 808 is aligned with the heading 806. As illustrated, the vertices 803A and 803C will be identified as extreme vertices along the longitudinal axis 808 (with the vertex 803A being an extreme vertex in the heading or front direction, and the vertex 803C being an extreme vertex in the rear direction). The vertices 803B, 803D, and 803E will not be identified as extreme vertices along the longitudinal axis 808 due to the vertices 803A and 803C having the greater distances from the lateral axis 810. Similarly, the vertices 803B and 803D will be identified as extreme vertices along the lateral axis 810 (with the vertex 803B being an extreme vertex in the right direction, and the vertex 803D being an extreme vertex in the left direction).

Figure 9A:
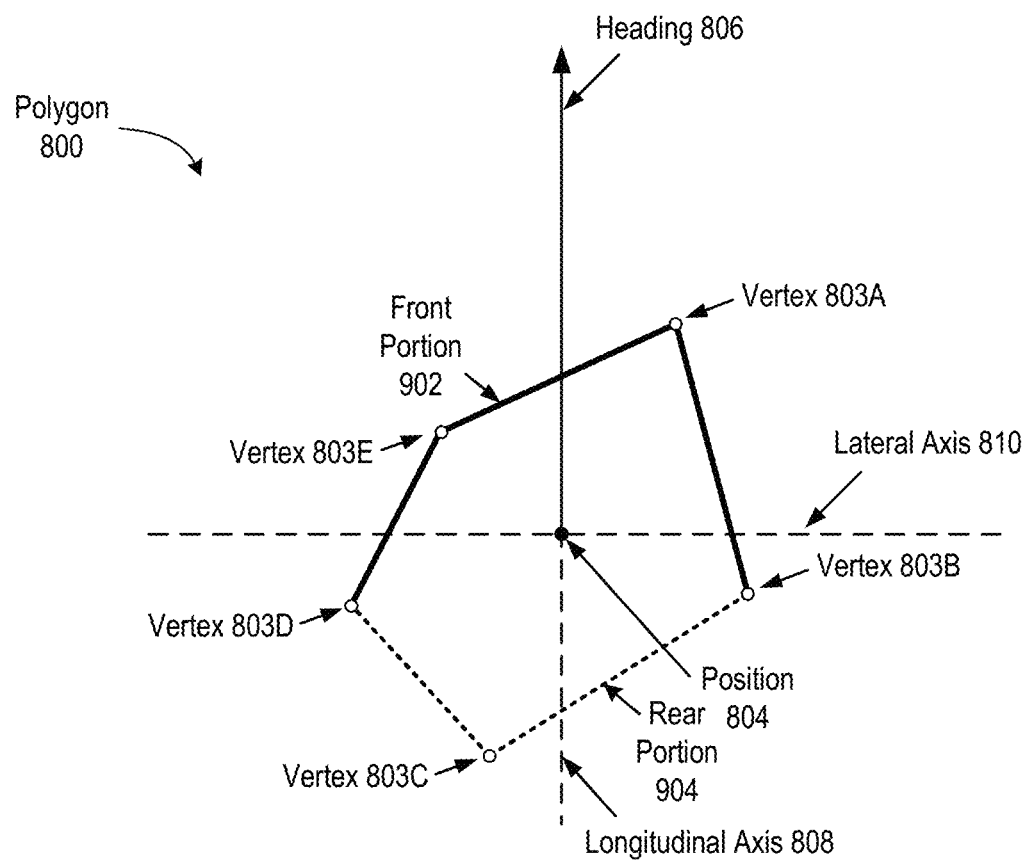
FIG. 9A illustrates a front portion and a rear portion of the polygon to which an expansion transformation is to be applied in accordance with some implementations of the present disclosure.

FIG. 9A illustrates a front portion 902 and a rear portion 904 of the polygon 800 to which an expansion transformation is to be applied in accordance with some implementations of the present disclosure. In some implementations, the front portion 902 (represented by edges with solid lines) and the rear portion 904 (represented by edges with dotted lines) are identified based on the extreme vertices identified along the lateral axis 810 (i.e., vertices 803B and 803D). The extreme vertices 803B and 803D represent the points at which the front portion 902 and the rear portion 904 are connected. In some implementations, an expansion transformation along the longitudinal axis 808 is applied to the polygon 800 at the lateral extreme vertices 803B and 803D, as discussed in FIG. 9B.

Figure 9B:
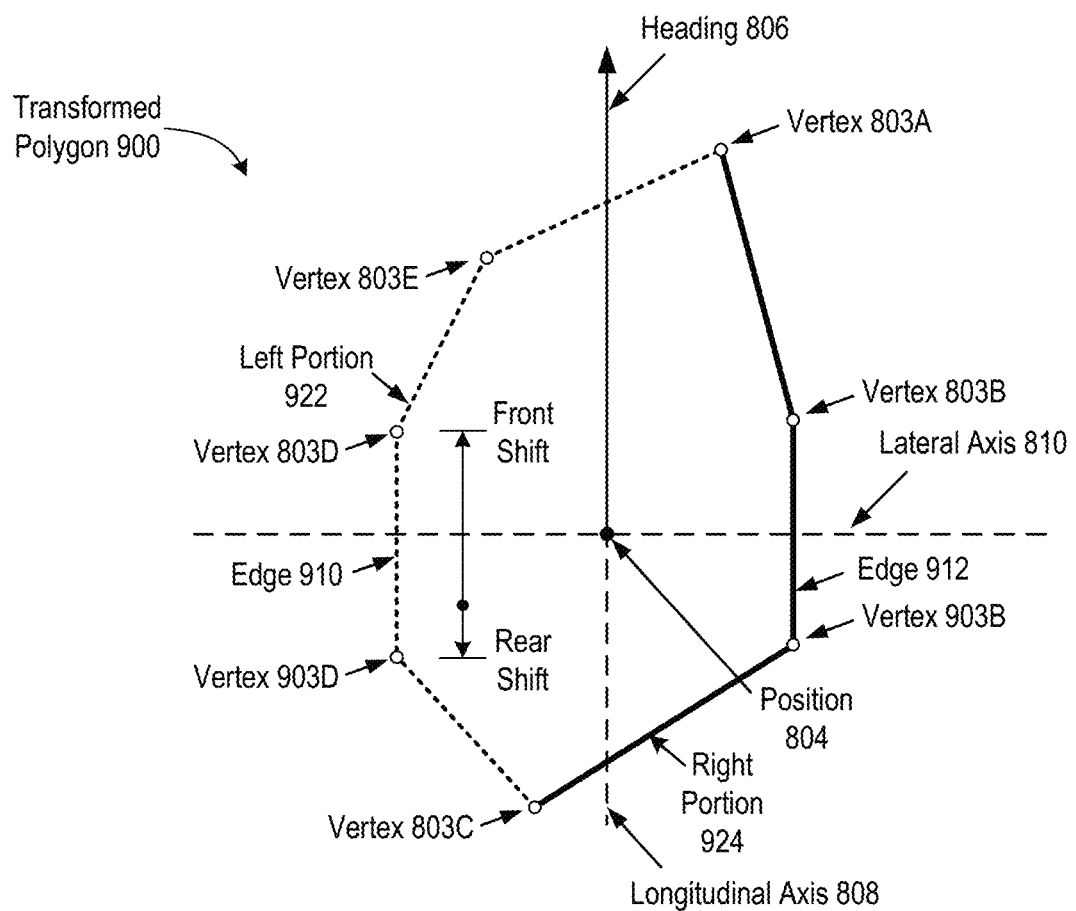
FIG. 9B illustrates applying an expansion transformation to the polygon along a longitudinal axis in accordance with some implementations of the present disclosure.

FIG. 9B illustrates applying an expansion transformation to the polygon 800 along the longitudinal axis 808 in accordance with some implementations of the present disclosure. The transformation along the longitudinal axis 808 results in a transformed polygon 900. As illustrated, the transformation produces a front shift for vertices 803A and 803E, and a rear shift for vertex 803C. In some implementations, the transformation further results in the generate of duplicate vertices 903B and 903D, which are duplicates of vertices 803B and 803D, respectively, with the vertices 803B and 803D being displaced by the front shift, and the vertices 903B and 903D being displaced by the rear shift. The vertices 803B and 903B define a new edge 912, and the vertices 803D and 903D define a new edge 910, with each of edges 910 and 912 having a length equal to the total distance of the front shift and the rear shift. It is noted that the labeling of the vertices 803B and 803D and their respective duplicate vertices 903B and 903D is arbitrary, as each original vertex may be swapped with its duplicate. In some implementations, the front and rear shift displacements are arbitrary and serve to stretch/extrude the polygon 800 in a manner that preserves angular information at the extreme vertices for any future expansion transformations.

In some implementations, depending on the orientation of the direction of the expansion transformation with respect to an edge of the polygon 800, the vertices along the edge of the polygon 800 are not duplicated. For example, if the polygon 800 was shaped such that an edge defined by vertices 803D and 803E was oriented along the longitudinal axis 808 (i.e., the edge is parallel to the expansion transformation), the vertices along the edge are not duplicated, as no additional vertices are needed to preserve the angles between edges during transformations. In some implementations, no lateral extreme vertices are duplicated by the expansion transformation (i.e., lateral extreme vertices on both sides of the polygon 800 define edges that are parallel to each other and the direction of the expansion transformation). In some implementations, only one lateral extreme vertex is duplicated (e.g., when only one of the lateral extreme vertices of the polygon 800 define an edge that is parallel to the direction of the expansion transformation).

In some implementations, a right portion 924 (represented by edges with solid lines) and the left portion 922 (represented by edges with dotted lines) are identified based on the extreme vertices identified along the longitudinal axis 808 (i.e., vertices 803A and 803C). The extreme vertices 803A and 803C represent the points at which the right portion 924 and the left portion 922 are connected. In some implementations, an expansion transformation along the longitudinal axis 808 is applied to the transformed polygon 800 at the longitudinal extreme vertices 803A and 803C, as discussed in FIG. 9C.

Figure 9C:
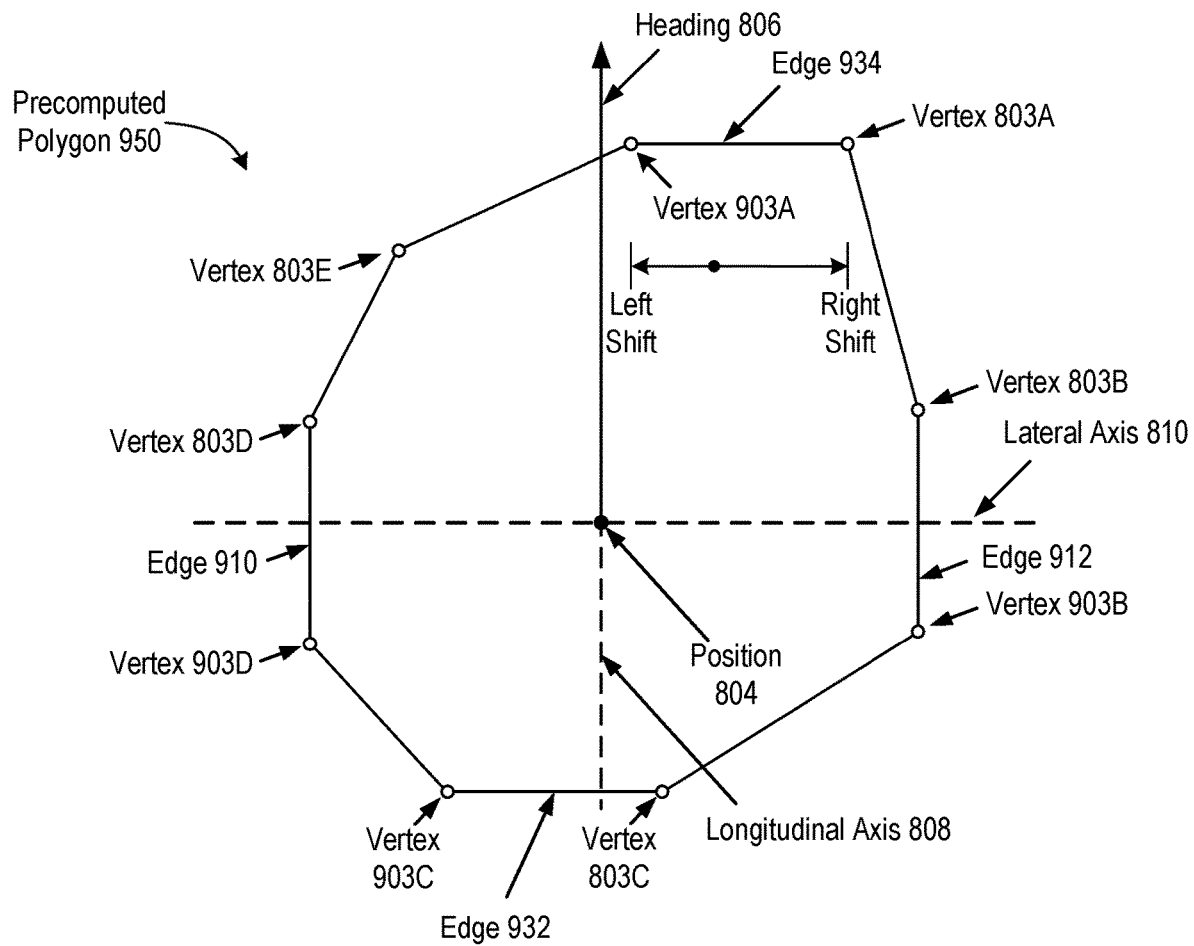
FIG. 9C illustrates applying a further expansion transformation to the polygon along a lateral axis to generate a precomputed polygon in accordance with some implementations of the present disclosure.

FIG. 9C illustrates applying a further expansion transformation to the transformed polygon 900 along the lateral axis 810 to generate a precomputed polygon 950 in accordance with some implementations of the present disclosure. As illustrated, the transformation produces a right shift for vertices 803A, 803B, 903B, and 803C, and a left shift for vertices 803E, 803D, and 903D. The transformation further results in the generate of duplicate vertices 903A and 903C, which are duplicates of vertices 803A and 803C, respectively, with the vertices 803A and 803C being displaced by the right shift, and the vertices 903A and 903C being displaced by the left shift. The vertices 803A and 903A define a new edge 934, and the vertices 803C and 903C define a new edge 932, with each of edges 932 and 934 having a length equal to the total distance of the right shift and the left shift. Similar to FIG. 9B, the labeling of the vertices 803A and 803C and their respective duplicate vertices 903C and 903C is arbitrary, as each original vertex may be swapped with its duplicate. In some implementations, the right and left shift displacements are arbitrary and serve to stretch/extrude the transformed polygon 900 in a manner that preserves angular information at the extreme vertices for any future expansion transformations. Similar to the discussion above with respect to FIG. 9B, in some implementations, extreme vertices are not duplicated when such vertices define an edge of the polygon 900 that is parallel to the direction of the expansion transformation. In some implementations, no longitudinal extreme vertices are duplicated by the expansion transformation (i.e., lateral extreme vertices on both sides of the polygon 900 define edges that are parallel to each other and the direction of the expansion transformation). In some implementations, only one longitudinal extreme vertex is duplicated (e.g., when only one of the longitudinal extreme vertices of the polygon 900 define an edge that is parallel to the direction of the expansion transformation).

In some implementations, the precomputed polygon 950 can be scaled along longitudinal axis 808 and/or its lateral axis 810 to model an agent state or a probabilistic overlap, with the scaling factors being based on a longitudinal or lateral uncertainty. Such transformations applied after the generation of the precomputed polygon 950 will preserve the number of vertices of the precomputed polygon 950. If the precomputed polygon 950 is rotated, angular information associated with the vertices is preserved, allowing new extreme vertices to be identified if needed. In some implementations, the expansion transformation along the lateral axis 810 is performed before the expansion transformation along the longitudinal axis 808.

Figure 10:
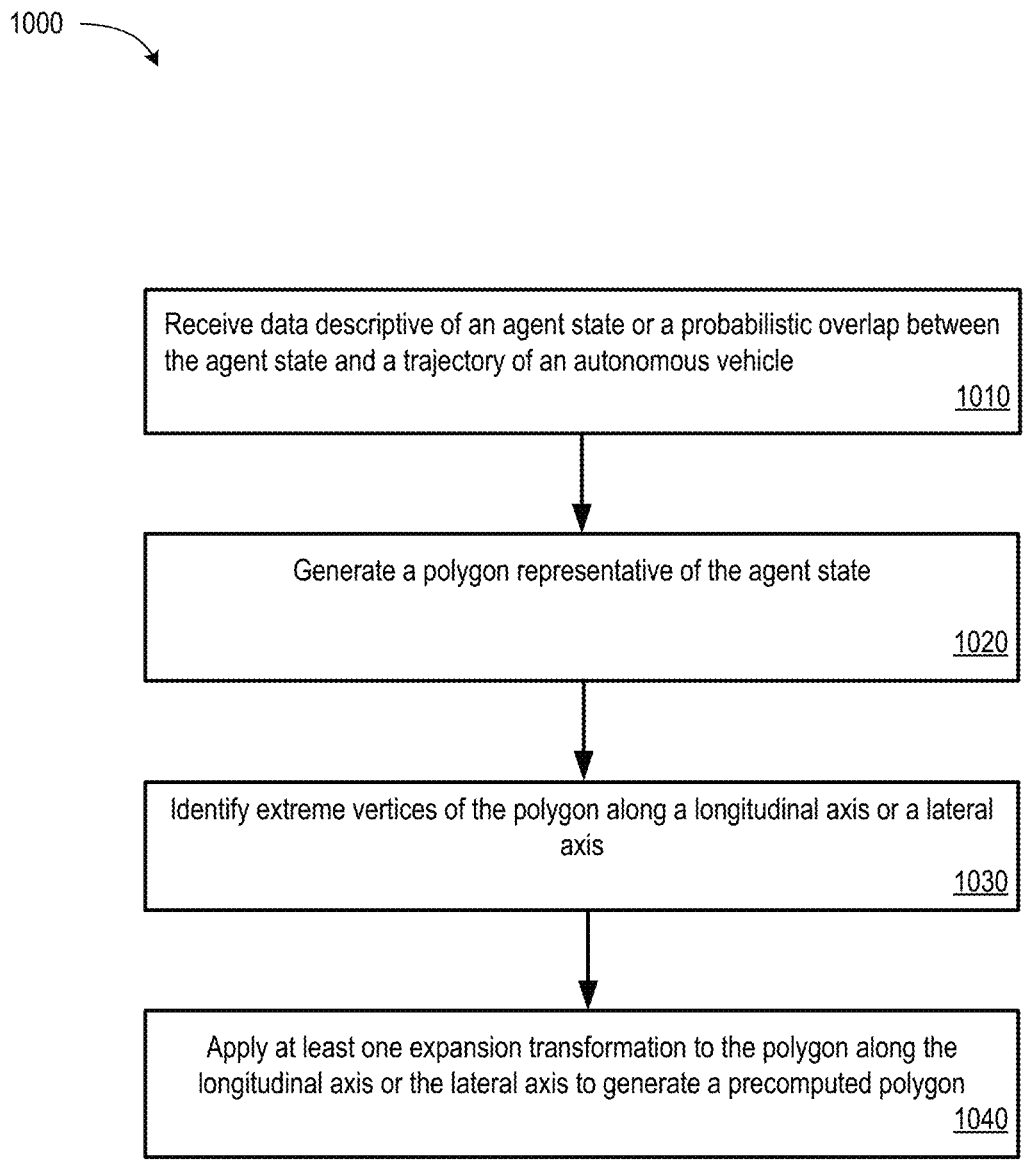
FIG. 10 depicts a flow diagram of an example method of generating a precomputed polygon for modeling positional uncertainty in a moving object in accordance with some implementations of the present disclosure.

FIG. 10 depicts a flow diagram of an example method 1000 of generating a precomputed polygon for modeling positional uncertainty in a moving object in accordance with some implementations of the present disclosure. The method 1000 described below and/or each of its individual functions, routines, subroutines, or operations can be performed by a processing device, having one or more processing units (CPU) and memory devices communicatively coupled to the CPU(s). The processing device executing the method 1000 can perform instructions from various components of the environment monitoring and prediction component 136, e.g., the probabilistic overlap module 137. In certain implementations, the method 1000 can be performed by a single processing thread. Alternatively, the method 1000 can be performed by two or more processing threads, each thread executing one or more individual functions, routines, subroutines, or operations of the method 1000. In an illustrative example, the processing threads implementing the method 1000 can be synchronized (e.g., using semaphores, critical sections, and/or other thread synchronization mechanisms). Alternatively, the processing threads implementing the method 700 can be executed asynchronously with respect to each other. Various operations of the method 1000 can be performed in a different order compared with the order shown in FIG. 10. Some operations of the method can be performed concurrently with other operations. Some operations can be optional. In at least one implementation, the method 1000 may be performed in combination with the method 700, for example, to compute the second box representative of the agent state in block 720 and/or to update the dimensions of the second box in block 730. In at least one implementation, the method 1000 may be performed in combination with the method 700, for example, to compute the initial overlap region in block 720.

Referring now to FIG. 10, the method 1000 begins at block 1010, where a data processing system (e.g., the data processing system 130 of the AV 100) receives data descriptive of an agent state of an object (e.g., the agent state 510), which may be one of many agent states that model a trajectory of the object. In some implementations, the data processing system receives data descriptive of a probabilistic overlap between the agent state and a trajectory of an AV (e.g., the overlap 620). In some implementations, the data descriptive of the agent state or the probabilistic overlap comprises data descriptive of a position and an orientation (e.g., heading 514 or heading 806) of the agent state. In some implementations, the data descriptive of the agent state further comprises a speed of the agent state, which may correlate with an uncertainty in the object's position. In some implementations, the data descriptive of the agent state corresponds to a particular frame at which the object is observed, and may be generated by an environment monitoring and prediction component (e.g., the environment monitoring and prediction component 136).

At block 1020, the data processing system generates a polygon representative of the agent state or the probabilistic overlap (e.g., the polygon 800). In some embodiments, the bounds of the polygon are representative of uncertainty in a position of an object along a longitudinal axis (e.g., a direction of motion) and a lateral axis. In some implementations, the polygon is a convex polygon defined by 3, 4, 5, or more vertices (e.g., vertices 803A-803E). In some implementations, the polygon is box-shaped (e.g., box 610). In some implementations, the as-generated polygon is not used in downstream data processing. Instead, one or more initial transformations are applied to the polygon to generate a precomputed polygon, which is used in downstream data processing.

At block 1030, the data processing system identifies extreme vertices of the polygon along a longitudinal axis parallel to a heading direction of the object (e.g., the longitudinal axis 808 parallel to the heading 806 of the polygon 800) or a lateral axis orthogonal to the heading direction (e.g., the lateral axis 810 of the polygon 800). In some implementations, the extreme vertices are identified along both the longitudinal axis and the lateral axis.

At block 1040, the data processing system applies, based on the extreme vertices, at least one expansion transformation to the polygon along the longitudinal axis (e.g., as illustrated in FIG. 9B) or the lateral axis (e.g., as illustrated in FIG. 9C) to generate a precomputed polygon (e.g., the precomputed polygon 950). In some implementations, a driving path or a speed of the AV is modified based on the precomputed polygon.

In some implementations, applying the at least one expansion transformation comprises applying a first expansion transformation to the polygon along the longitudinal axis to duplicate each lateral extreme vertex (e.g., the vertices 803D and 903D, and the vertices 803B and 903B), and a second expansion transformation to the polygon along the lateral axis to duplicate each longitudinal extreme vertex (e.g., the vertices 803A and 903A, and the vertices 803C and 903C). In some implementations, the expansion transformation along the lateral axis is applied to the polygon prior to the expansion transformation along the longitudinal axis.

In some implementations, the data processing system applies at least one additional expansion transformation to the precomputed polygon based on an uncertainty of the agent state. In some implementations, a total number of vertices of the precomputed polygon is unchanged by the additional expansion transformation. In some implementations, the at least one additional expansion transformation is applied responsive to the data processing system receiving a query from a control system of the AV (e.g., the AVCS 140). For example, the query can indicate a level of risk tolerance with respect to the agent state. The level of risk tolerance, for example, may be represented as a standard deviation of a Gaussian distribution, with one or more of the lateral bounds of the agent state being shifted to a particular lateral location corresponding to the standard deviation. In some implementations, the query may specify a single lateral bound to update, for example, if the AV control system seeks to determine whether maneuvering the AV in a particular direction with respect to the object is feasible. In such implementations, the AV control system may cause the AV to maneuver in that direction if a lateral uncertainty is reduced as a result. In some implementations, a change in one or more of the lateral bounds of the agent state can range from 0.1 meters to about 2 meters.

In some embodiments, the data processing system transmits, to the control system, data representative of uncertainty in a longitudinal position and a lateral position of the object computed based on the precomputed polygon. In some implementations, the control system is to modify the driving path or the speed of the AV based on the data representative of uncertainty in the longitudinal position and the lateral position. In some implementations, the data processing system computes a trajectory of the object comprising a series of agent states that includes the agent state of the object. In some implementations, the precomputed polygon is used to model each agent state in the series of agent states.

Figure 11:
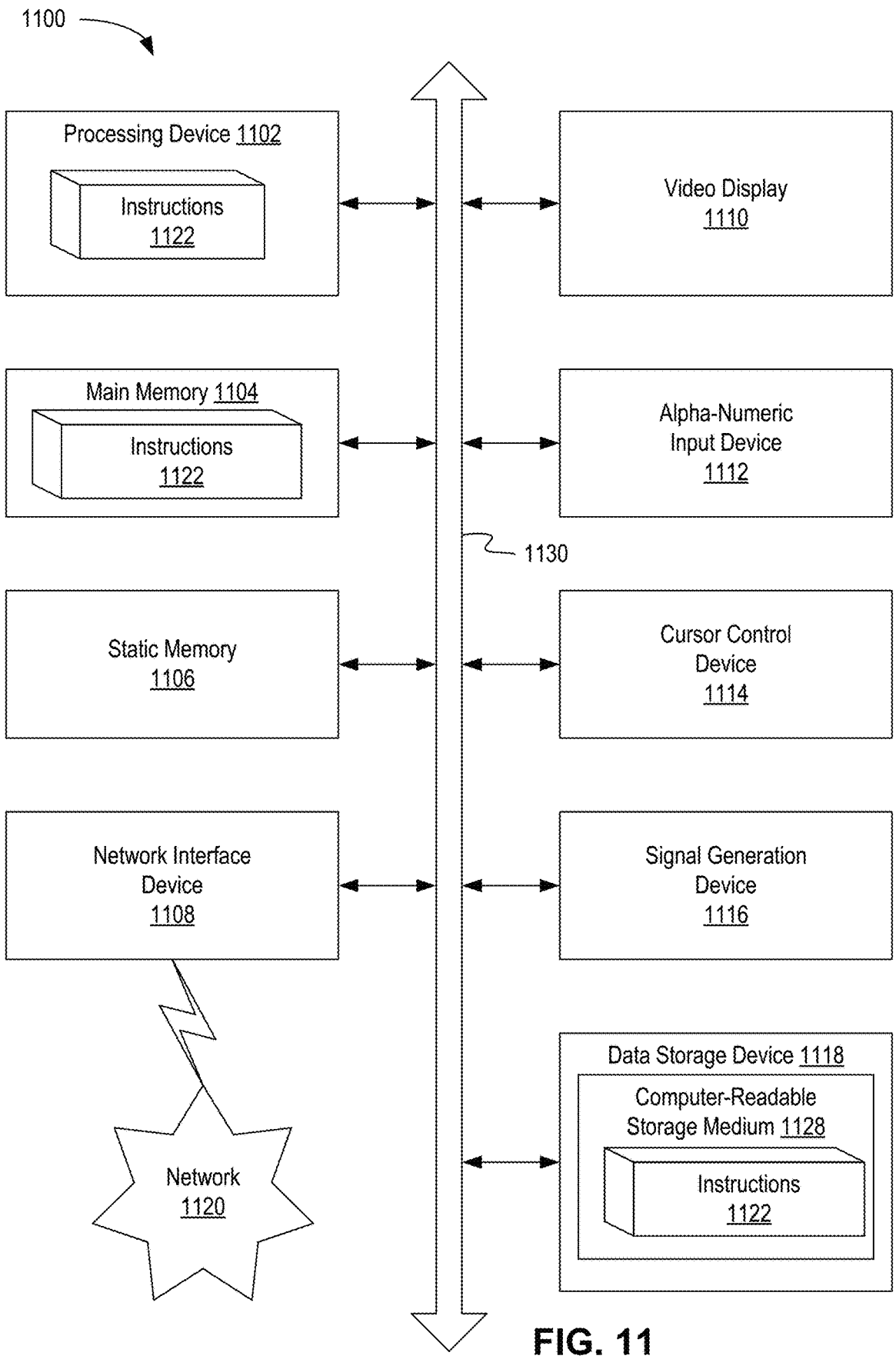
FIG. 11 depicts a block diagram of an example computer device for use in accordance with some implementations of the disclosure.

FIG. 11 depicts a block diagram of an example computer device 1100 capable of enabling Doppler-assisted object identification, tracking, and prediction for autonomous driving vehicle applications. Example computer device 1100 can be connected to other computer devices in a LAN, an intranet, an extranet, and/or the Internet. Computer device 1100 can operate in the capacity of a server in a client-server network environment. Computer device 1100 can be a personal computer (PC), a set-top box (STB), a server, a network router, switch or bridge, or any device capable of executing a set of instructions (sequential or otherwise) that specify actions to be taken by that device. Further, while only a single example computer device is illustrated, the term "computer" shall also be taken to include any collection of computers that individually or jointly execute a set (or multiple sets) of instructions to perform any one or more of the methods discussed herein.

Example computer device 1100 can include a processing device 1102 (also referred to as a processor or CPU), a main memory 1104 (e.g., read-only memory (ROM), flash memory, dynamic random access memory (DRAM) such as synchronous DRAM (SDRAM), etc.), a static memory 1106 (e.g., flash memory, static random access memory (SRAM), etc.), and a secondary memory (e.g., a data storage device 1118), which can communicate with each other via a bus 1130.

Processing device 1102 represents one or more general-purpose processing devices such as a microprocessor, central processing unit, or the like. More particularly, processing device 1102 can be a complex instruction set computing (CISC) microprocessor, reduced instruction set computing (RISC) microprocessor, very long instruction word (VLIW) microprocessor, processor implementing other instruction sets, or processors implementing a combination of instruction sets. Processing device 1102 can also be one or more special-purpose processing devices such as an application specific integrated circuit (ASIC), a field programmable gate array (FPGA), a digital signal processor (DSP), network processor, or the like. In accordance with one or more aspects of the present disclosure, processing device 1102 can be configured to execute instructions performing the methods 700 or 1000 as described above.

Example computer device 1100 can further comprise a network interface device 1108, which can be communicatively coupled to a network 1120. Example computer device 1100 can further comprise a video display 1110 (e.g., a liquid crystal display (LCD), a touch screen, or a cathode ray tube (CRT)), an alphanumeric input device 1112 (e.g., a keyboard), a cursor control device 1114 (e.g., a mouse), and an acoustic signal generation device 1116 (e.g., a speaker).

Data storage device 1118 can include a computer-readable storage medium (or, more specifically, a non-transitory computer-readable storage medium) 1128 on which is stored one or more sets of executable instructions 1122. In accordance with one or more aspects of the present disclosure, executable instructions 1122 can comprise executable instructions for performing the methods 700 or 1000 as described above.

Executable instructions 1122 can also reside, completely or at least partially, within main memory 1104 and/or within processing device 1102 during execution thereof by example computer device 1100, main memory 1104 and processing device 1102 also constituting computer-readable storage media. Executable instructions 1122 can further be transmitted or received over a network via network interface device 1108.

While the computer-readable storage medium 1128 is shown in FIG. 11 as a single medium, the term "computer-readable storage medium" should be taken to include a single medium or multiple media (e.g., a centralized or distributed database, and/or associated caches and servers) that store the one or more sets of operating instructions. The term "computer-readable storage medium" shall also be taken to include any medium that is capable of storing or encoding a set of instructions for execution by the machine that cause the machine to perform any one or more of the methods described herein. The term "computer-readable storage medium" shall accordingly be taken to include, but not be limited to, solid-state memories, and optical and magnetic media.

Some portions of the detailed descriptions above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "computing," "applying," "identifying," "removing," "searching," "determining," "storing," "adjusting," "causing," "returning," "comparing," "creating," "stopping," "loading," "copying," "replacing," "performing," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Examples of the present disclosure also relate to an apparatus for performing the methods described herein. This apparatus can be specially constructed for the required purposes, or it can be a general purpose computer system selectively programmed by a computer program stored in the computer system. Such a computer program can be stored in a computer readable storage medium, such as, but not limited to, any type of disk including optical disks, CD-ROMs, and magnetic-optical disks, read-only memories (ROMs), random access memories (RAMs), EPROMs, EEPROMs, magnetic disk storage media, optical storage media, flash memory devices, other type of machine-accessible storage media, or any type of media suitable for storing electronic instructions, each coupled to a computer system bus.

The methods and displays presented herein are not inherently related to any particular computer or other apparatus. Various general purpose systems can be used with programs in accordance with the teachings herein, or it may prove convenient to construct a more specialized apparatus to perform the required method steps. The required structure for a variety of these systems will appear as set forth in the description below. In addition, the scope of the present disclosure is not limited to any particular programming language. It will be appreciated that a variety of programming languages can be used to implement the teachings of the present disclosure.

It is to be understood that the above description is intended to be illustrative, and not restrictive. Many other implementation examples will be apparent to those of skill in the art upon reading and understanding the above description. Although the present disclosure describes specific examples, it will be recognized that the systems and methods of the present disclosure are not limited to the examples described herein, but can be practiced with modifications within the scope of the appended claims. Accordingly, the specification and drawings are to be regarded in an illustrative sense rather than a restrictive sense. The scope of the present disclosure should, therefore, be determined with reference to the appended claims, along with the full scope of equivalents to which such claims are entitled.

What is claimed is:

1. A method comprising:
receiving, by a data processing system of an autonomous vehicle (AV), data related to an agent state of an object;
generating a polygon corresponding to the agent state;
identifying extreme vertices of the polygon along a longitudinal axis parallel to a heading direction of the object or along a lateral axis orthogonal to the heading direction;
applying, based on the extreme vertices, at least one expansion transformation to the polygon along the longitudinal axis or the lateral axis to generate a precomputed polygon; and
transmitting, to a control system of the AV to modify a driving path or speed of the AV, data representative of uncertainty in a longitudinal position or in a lateral position of the object computed based on the precomputed polygon.

2. The method of claim 1, wherein identifying the extreme vertices of the polygon comprises:
identifying longitudinal extreme vertices of the polygon along the longitudinal axis; and
identifying lateral extreme vertices of the polygon along the lateral axis.

3. The method of claim 2, wherein applying the at least one expansion transformation to the polygon along the longitudinal axis or the lateral axis comprises:
applying a first expansion transformation to the polygon along the longitudinal axis to duplicate each lateral extreme vertex; and
applying a second expansion transformation to the polygon along the lateral axis to duplicate each longitudinal extreme vertex.

4. The method of claim 1, further comprising:
applying at least one additional expansion transformation to the precomputed polygon based on an uncertainty of the agent state, wherein a total number of vertices of the precomputed polygon is unchanged by the additional expansion transformation.

5. The method of claim 1, wherein at least one additional expansion transformation is applied to the precomputed polygon responsive to the data processing system receiving a query from the control system of the AV, the query indicating a level of risk tolerance with respect to the agent state.

6. The method of claim 1, further comprising:
computing a trajectory of the object comprising a series of agent states that includes the agent state of the object, wherein the precomputed polygon is used to model each agent state in the series of agent states.

7. A system comprising:
a memory; and
a data processing system of an autonomous vehicle (AV) communicatively coupled to the memory, wherein the data processing system is to:
receive data related to an agent state of an object;
generate a polygon corresponding to the agent state;
identify extreme vertices of the polygon along a longitudinal axis parallel to a heading direction of the object or along a lateral axis orthogonal to the heading direction;
apply, based on the extreme vertices, at least one expansion transformation to the polygon along the longitudinal axis or the lateral axis to generate a precomputed polygon; and
transmit, to a control system of the AV to modify a driving path or speed of the AV, data representative of uncertainty in a longitudinal position or in a lateral position of the object computed based on the precomputed polygon.

8. The system of claim 7, wherein to identify the extreme vertices of the polygon, the data processing system is to:
identify longitudinal extreme vertices of the polygon along the longitudinal axis; and
identify lateral extreme vertices of the polygon along the lateral axis.

9. The system of claim 8, wherein to apply the at least one expansion transformation to the polygon along the longitudinal axis or the lateral axis, the data processing system is to:
apply a first expansion transformation to the polygon along the longitudinal axis to duplicate each lateral extreme vertex; and
apply a second expansion transformation to the polygon along the lateral axis to duplicate each longitudinal extreme vertex.

10. The system of claim 7, wherein the data processing system is to further:
apply at least one additional expansion transformation to the precomputed polygon based on an uncertainty of the agent state, wherein a total number of vertices of the precomputed polygon is unchanged by the additional expansion transformation.

11. The system of claim 7, wherein at least one additional expansion transformation is to be applied to the precomputed polygon responsive to the data processing system receiving a query from the control system of the AV, the query indicating a level of risk tolerance with respect to the agent state.

12. The system of claim 7, wherein the data processing system is to further:
compute a trajectory of the object comprising a series of agent states that includes the agent state of the object, wherein the precomputed polygon is to be used to model each agent state in the series of agent states.

13. A non-transitory computer-readable medium having instructions stored thereon that, when executed by a computing device, cause the computing device to:
receive data related to an agent state of an object;
generate a polygon corresponding to the agent state;
identify extreme vertices of the polygon along a longitudinal axis parallel to a heading direction of the object or along a lateral axis orthogonal to the heading direction;
apply, based on the extreme vertices, at least one expansion transformation to the polygon along the longitudinal axis or the lateral axis to generate a precomputed polygon; and transmit, to a control system of an AV to modify a driving path or speed of the AV, data representative of uncertainty in a longitudinal position or in a lateral position of the object computed based on the precomputed polygon.

14. The non-transitory computer-readable medium of claim 13, wherein to identify the extreme vertices of the polygon, the computing device is to:
   identify longitudinal extreme vertices of the polygon along the longitudinal axis; and
   identify lateral extreme vertices of the polygon along the lateral axis.

15. The non-transitory computer-readable medium of claim 14, wherein to apply the at least one expansion transformation to the polygon along the longitudinal axis or the lateral axis, the computing device is to:
   apply a first expansion transformation to the polygon along the longitudinal axis to duplicate each lateral extreme vertex; and
   apply a second expansion transformation to the polygon along the lateral axis to duplicate each longitudinal extreme vertex.

16. The non-transitory computer-readable medium of claim 13, wherein the computing device is to further:
   apply at least one additional expansion transformation to the precomputed polygon based on an uncertainty of the agent state, wherein a total number of vertices of the precomputed polygon is unchanged by the additional expansion transformation.

17. The non-transitory computer-readable medium of claim 13, wherein at least one additional expansion transformation is to be applied to the precomputed polygon responsive to the computing device receiving a query from the control system of the AV, the query indicating a level of risk tolerance with respect to the agent state.

18. The non-transitory computer-readable medium of claim 13, wherein the computing device is to further:
   compute a trajectory of the object comprising a series of agent states that includes the agent state of the object, wherein the precomputed polygon is to be used to model each agent state in the series of agent states.

* * * * *